US008934023B2

(12) United States Patent
Webb et al.

(10) Patent No.: US 8,934,023 B2
(45) Date of Patent: Jan. 13, 2015

(54) METHOD AND SYSTEM FOR INTRODUCING CONTROLLED DISTURBANCE INTO AN ACTIVELY STABILIZED SYSTEM

(71) Applicant: Freefly Systems, Inc., Redmond, WA (US)

(72) Inventors: Steve Webb, Gravesend (GB); John Ellison, Ipswich (GB); Tabb Firchau, Redmond, WA (US)

(73) Assignee: Freefly Systems, Inc., Redmond, WA (US)

( * ) Notice: Subject to any disclaimer, the term of this patent is extended or adjusted under 35 U.S.C. 154(b) by 0 days.

(21) Appl. No.: 14/214,499

(22) Filed: Mar. 14, 2014

(65) Prior Publication Data

US 2014/0267810 A1   Sep. 18, 2014

Related U.S. Application Data

(60) Provisional application No. 61/792,878, filed on Mar. 15, 2013.

(51) Int. Cl.
*H04N 5/228*  (2006.01)
*H04N 5/225*  (2006.01)
*H04N 5/232*  (2006.01)

(52) U.S. Cl.
CPC ............................. *H04N 5/23248* (2013.01)
USPC ................... 348/208.99; 348/208.7; 348/375; 396/55

(58) Field of Classification Search
CPC .......... H04N 5/23248; H04N 5/23258; H04N 5/2328

USPC ............ 348/208.16, 208.7, 373, 375, 208.99; 396/55

See application file for complete search history.

(56) References Cited

U.S. PATENT DOCUMENTS

| | | | |
|---|---|---|---|
| 5,457,370 A | 10/1995 | Edwards | |
| 5,897,223 A * | 4/1999 | Tritchew et al. | 348/144 |
| 6,222,546 B1 * | 4/2001 | Yokoyama et al. | 345/418 |
| 6,268,863 B1 | 7/2001 | Rioux | |
| 8,346,070 B2 * | 1/2013 | Beasley | 348/373 |
| 8,350,916 B2 * | 1/2013 | Ohmiya et al. | 348/208.99 |
| 2003/0024333 A1 * | 2/2003 | Wyse | 74/5.4 |
| 2004/0173726 A1 * | 9/2004 | Mercadal et al. | 248/660 |
| 2011/0221900 A1 * | 9/2011 | Reich | 348/208.2 |

FOREIGN PATENT DOCUMENTS

DE   102008003680 A1   1/2009

OTHER PUBLICATIONS

"International Search Report & Written Opinion for PCT Application No. PCT/EP2014/055219", Mailed Date: Jun. 10, 2014, Filed Date: Mar. 14, 2014.

* cited by examiner

*Primary Examiner* — Nhan T Tran
(74) *Attorney, Agent, or Firm* — Saliwanchik, Lloyd & Eisenschenk, P.A.

(57) ABSTRACT

A method for introducing controlled disturbance into a video being captured by a camera housed by an active stabilization system executing a stabilization process to stabilize a pointing angle of a camera housed by the active stabilization system in accordance with a commanded angle is provided. The method comprises acquiring a measurement associated with a movement of the active stabilization system, determining a noise value based on the acquired measurement, and injecting the noise value into the stabilization process causing the process to adjusting adjust the pointing angle of the camera in a direction away from the a commanded pointing angle of the camera using the noise value.

20 Claims, 13 Drawing Sheets

METHOD AND SYSTEM FOR INTRODUCING CONTROLLED DISTURBANCE INTO AN ACTIVELY STABILIZED SYSTEM

CROSS-REFERENCE TO RELATED APPLICATION

This application claims the benefit of Provisional Patent Application No. 61/792,878, filed on Mar. 15, 2013, which is hereby incorporated by reference herein in its entirety.

FIELD OF THE TECHNOLOGY

The present disclosure relates to stabilization systems, and more particularly to an improved, lightweight, hand-held or vehicle-mounted camera stabilization system for use in photographic or video-related applications.

BACKGROUND

In many applications, it is desirable to stabilize a payload so that it is not affected by vibrations and unwanted movements. This is particularly important in film-production, where any unintentional shaking or movements introduced by, for example, a camera operator can result in footage that is uncomfortable to watch or framed incorrectly.

Passive stabilization mounts have been used to reduce shaking and smooth out movements by using mechanical systems such as springs, shock-absorbers and counterbalances. However, these systems can be large and cumbersome to operate, and typically require a great deal of experience to control effectively. Software-based digital stabilization, as well as optical stabilization exists, but they are typically restricted to correcting small movements.

One technology that is becoming increasingly prevalent is that of active stabilization. The currently available active stabilization systems use motors to counteract any movements detected by motion sensors. Optical gyroscopic sensors, which are sufficiently accurate to detect small vibrations, are typically used in such systems. However, the optical gyroscopic sensors tend to be large and very expensive.

Thus, it is desirable to provide a low-cost, lightweight stabilization system that can effectively remove unwanted movements, while also providing a level of control and flexibility to operators to easily and intuitively capture the footage they require.

SUMMARY

The described embodiments of the invention provide for a method and a system for introducing controlled disturbance into an active stabilization system actively stabilizing a camera by adjusting a camera's pointing angle, while generally maintaining stabilization of the camera. The controlled disturbance enables a camera operator to create an illusion that a scene was filmed in a first-person view, immersing the watching audience into the scene with more realism, while the system continues to maintain accurate stabilization allowing the camera operator to successfully film the scene.

In one embodiment, the present disclosure provides a method for introducing controlled disturbance into an active stabilization system executing a stabilization process to stabilize a pointing angle of a camera housed by the system in accordance with a commanded angle, the method comprising: acquiring a measurement associated with a movement of the active stabilization system; determining a noise value based on the acquired measurement; and injecting the noise value into the stabilization process causing the process to adjust the pointing angle of the camera in a direction away from the commanded angle of the camera.

In some example embodiments, the injecting step comprises: adjusting the commanded pointing angle using the noise value; and executing the stabilization process based on the adjusted commanded angle.

In some example embodiments, the injecting step comprises: executing an angle-based control loop of the stabilization process based on the commanded angle to calculate a commanded rate; adjusting the commanded angle rate using the noise value; and continuing executing the stabilization process based on the adjusted commanded angle.

In some example embodiments, the injecting step comprises: executing a control loop based on the commanded angle issue a control command directed to maintain pointing angle at the commanded pointing angle; adjusting the control command based on the noise value; and providing the adjusted control command to an actuator of the active stabilization system to adjust the pointing angle of the camera in a direction away from the commanded pointing angle.

In some example embodiments, the determining step comprises: filtering the measurement to derive a transitory component of the measurement; and scaling the transitory component to determine the noise value In some example embodiments, the measurement associated with the movement of the active stabilization system is filtered using a high-pass filter to remove a DC component from the measurement.

In some example embodiments, different scale factors are used in the scaling step in relation to at least two of a tilt axis, a pan axis, and a roll axis.

In some example embodiments, different bandwidths are set for filters used for filtering the measurement in relation to at least two of a tilt axis, a pan axis, and a roll axis.

In some example embodiments, the method further comprises adjusting one or more of a scale factor used for scaling of the transitory component and a bandwidth of a filter used for filtering the measurement.

In some example embodiments, the method further comprises setting the scale factor to zero in association with one or more of a pan axis, tilt axis, and a roll axis to stop introduction of the disturbance for the one or more axes.

In some example embodiments, the method further comprises repeating the acquiring, determining, and injecting steps to introduce controlled disturbance synchronously to the movement of the active stabilization system.

In some example embodiments, measurements associated with a movement of the active stabilization system include one or more of: a measurement based on a joint angle of the active stabilization system for one of a pan axis, a tilt axis, and a roll axis, an acceleration measurement derived by an inertial measurement unit of the active stabilization system for one or more of the pan axis, the tilt axis, and the roll axis with a reference to a field of view of the camera; an acceleration measurement derived by a sensor in association with the movement of the active stabilization system, wherein the sensor is located remotely to the active stabilization system; a velocity measurement derived by the inertial measurement unit of the active stabilization system for one or more of the pan axis, the tilt axis, and the roll axis; an actuator torque control command, a current torque measurement, and a positional measurement derived based on one or more of a barometer measurement in combination with the acceleration measurement derived by the inertial measurement unit, a distance measurement derived by a ranges sensor of the active stabilization system, a GPS measurement.

In some example embodiments, the acquiring step comprises acquiring the measurement associated with a movement of the active stabilization system using a sensor located remotely to the active stabilization system.

In some example embodiments, the active stabilization system is positioned on a moving vehicle and the sensor is located on the vehicle remotely to the active stabilization system.

In some example embodiments, the method is performed for one of a pan axis, a tilt axis, and a roll axis; and the pointing angle of the camera is adjusted for the one axis.

In some example embodiments, the method further comprises: performing the acquiring and determining steps for two or three of a pan axis, a tilt axis, and a roll axis to determine respective two or three noise values; and combining the two or three noise values to determine a combined noise value.

In some example embodiments, the injecting step comprises: injecting the noise value into the stabilization process causing the process to adjust the pointing angle of the camera in a direction away from the commanded pointing angle of the camera in relation to only one of the three axes using the combined noise value.

In some example embodiments the commanded angle is adjusted in one of: a direction opposite to a direction indicated by the acquired measurement and a same direction as the direction indicated by the acquired measurement.

In some example embodiments, the noise value is one of an angle, an angular rate, and a control torque, and a drive current.

In some example embodiments, the method further comprises modifying the noise value, prior to injecting the noise value into the stabilization process, based on one or more of: a pre-recorded noise value, a pre-generated noise value, and independently live-generated noise value.

In some example embodiments, the method further comprises modifying the transitory component based on one or more of a pre-recorded measurement, a pre-generated measurement, and an independently live-generated measurement.

In some example embodiments, a system is provided, the system comprising one or more processors, and memory comprising instructions which when executed by the one or more processors causes the system to carry out any of the methods described above.

In some example embodiments, a non-transitory computer-readable medium is provided, the medium storing program instructions for causing a processor to perform any of the methods described above.

In another embodiment, the present disclosure provides an active stabilization system, housing a camera, for introducing controlled disturbance, the system comprising: one or more sensor devices configured to derive measurements associated with a movement of the active stabilization system; and an active stabilization controller configured to stabilize a pointing angle of the camera for one or more of a pan axis, a tilt axis, and a roll axis in accordance with a commanded angle; wherein the active stabilization system configured to perform a method according to any of claims 1 to 19 using one more measurements derived by the one or more sensor devices to adjust the pointing angle of the camera in a direction away from the commanded angle of the camera.

In some example embodiments, the system comprises an inertial measurement unit including the one or more sensor devices.

In some example embodiments, the active stabilization system is further configured to perform any of the methods described above for two or more of a pan axis, tilt axis, and a roll axis, in parallel.

In some example embodiments, the system supports an induced disturbance mode that is activatable and is configured to perform a method according to any of claims 1 to 19 only when the induced disturbance mode is activated.

In another embodiment, the present disclosure provides a method for introducing controlled disturbance into an active stabilization system executing a stabilization process to stabilize a pointing angle of a camera housed by the system in accordance with a commanded angle, the method comprising: acquiring a measurement associated with a movement of the active stabilization system; determining a noise value based on the acquired measurement; modifying one or more of a current pointing angle and a current angle rate, as measured by an inertial measurement unit, based on the determined noise value; and executing the stabilization process based on the one more of the modified current pointing angle and the modified current angle rate, causing the process to adjust the pointing angle of the camera in a direction away from the commanded angle of the camera.

In some example embodiments, the modifying step is performed by the inertial measurement unit, wherein the one more of the modified current pointing angle and the modified current angle rate form an output of the inertial measurement unit.

BRIEF DESCRIPTION OF DRAWINGS

Examples of the present proposed approach will now be described in detail with reference to the accompanying drawings, in which.

DETAILED DESCRIPTION

Figure 1:
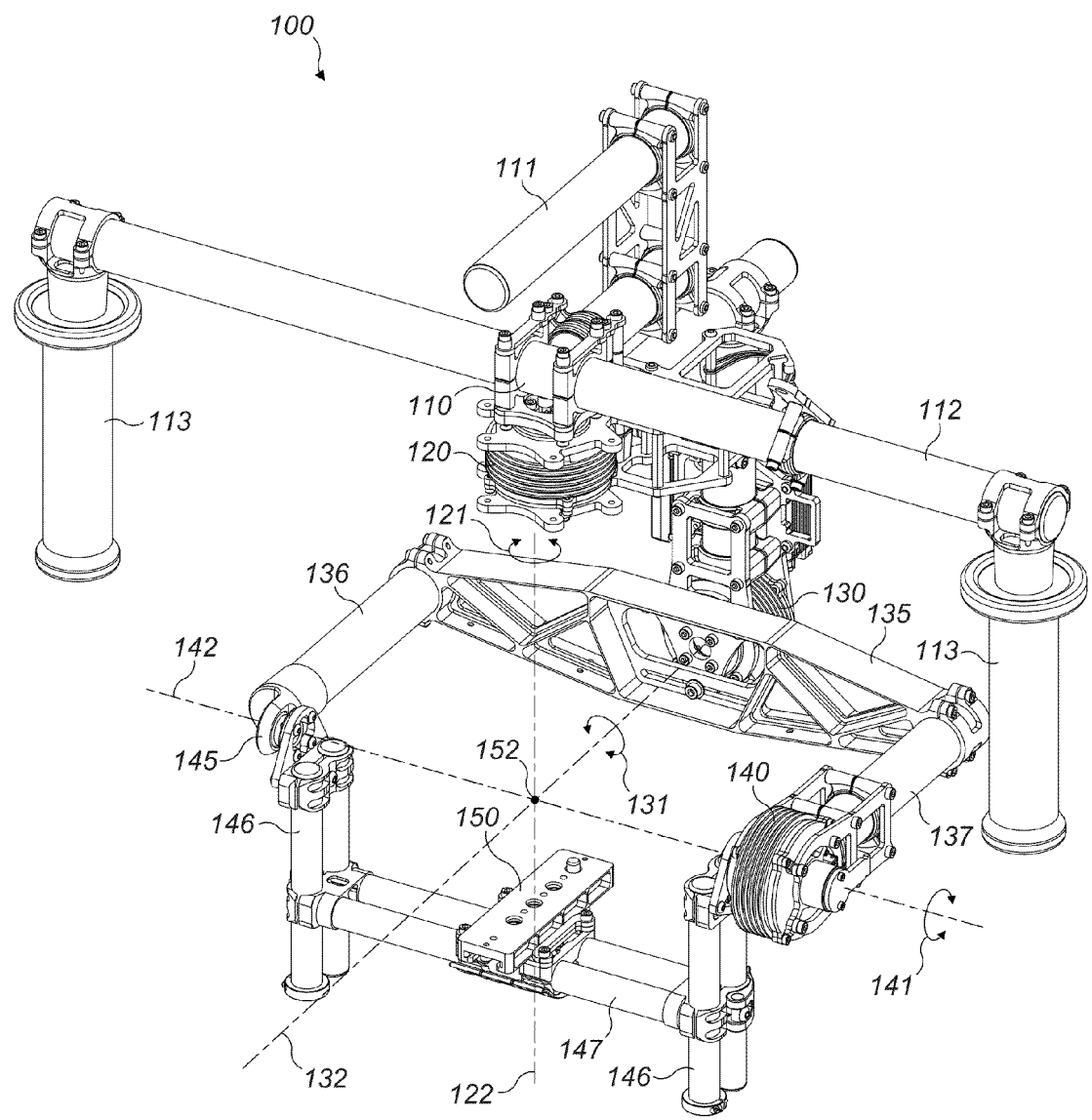
FIG. 1 shows a perspective view of a 3-axis stabilization system for carrying out stabilization techniques in accordance with the present disclosure, according to some embodiments.

FIG. 1 shows a 3-axis camera stabilization system 100, also referred to as a gimbal, according to some embodiments of the present invention. The system 100 includes a support base 110 to which a support frame 112 is attached for manual support and manipulation by an operator. Two handles 113 are attached to the support frame 112 on either side of the support base 110 to allow for two-handed operation of the gimbal 100 and full control over movement of the gimbal 100. A secondary frame 111 is attached to the support base 110 and may be used to attach the overall system 100 to a vehicle or other support or mount. The secondary frame 111 may also be used as a handle for single-handed operation by the operator. Further, peripheral devices may be attached to the secondary frame 111.

The illustrated system 100 is equipped with three motors, a pan axis motor 120, a tilt axis motor 140 and a roll axis motor 130. These motors can provide a rotational input in either direction around the pan 122, tilt 142, and roll 132 axes of the assembly as shown by arrows 121, 131, and 141, respectively. The three motors 120, 130, and 140, when working together, allow a full range of movement of a payload within the gimbal 100. In particular, the pan axis motor 120 is fixed (attached, or otherwise permanently secured, or is removable) to the support base 110 and configured (constructed, designed, or the like) to rotate a structure housing the roll axis motor 120. The roll axis motor 120 is in turn configured to rotate a structure housing the tilt axis motor 140, which is configured to rotate a payload (not shown).

In the illustrated system 100, the roll axis motor 130 rotates a roll beam 135, to which horizontal members 136 and 137 are attached. The tilt axis motor 140 is attached to one horizontal member 137, and its opposing pivot 145 is attached to the other horizontal member 136. The tilt axis motor 140 and the opposing pivot 145 rotate down-tubes 146 along with the cross member 147 attached to the down-tube 146, thereby rotating the payload attached to the cross member 147.

The payload will typically be a camera mounted to the system by a camera mounting arrangement 150. The camera mounting arrangement 150 is generally in the form of a plate, "shoe," or the like, which defines one or more protrusions for engaging with a corresponding recess on a mounting part of the camera. However, various coupling, engaging, and/or fixing means may be provided for securing the camera to the mounting arrangement 150, including but not limited to screw threads, clips, slide and lock mechanisms, and/or the like (not shown).

A point of intersection 152 of the three orthogonal axes 122, 132, and 142 preferably remains generally fixed regardless of the rotation of any of the three motors 120, 130, and 140. In order for a camera mounted in the stabilization system 100 to achieve "passive stability", the center of gravity (COG) of the camera, which varies for different camera designs, should be located at or as near as possible to point 152 where the three orthogonal axes 122, 132, and 142 intersect.

By positioning the camera COG at the intersection point 152, rotational moments applied to the camera by lateral acceleration disturbances of the system are reduced, or even eliminated. Furthermore, the inertia of the payload itself tends to cause the payload to maintain a pointing direction, notwithstanding frictional forces at the axes of rotation. By incorporating these or some other forms of passive stabilization into the arrangement of the system 100, the power draw of active stabilization is kept minimal, particularly when not in motion.

Adjustment means are provided within the stabilization system 100 in order to adjust the COG of a camera mounted to the mounting arrangement 150. For example, in FIG. 1, the mounting arrangement 150 is configured to enable repositioning of a mounted camera relative to each of the orthogonal axes. Centering the COG of the camera, mounted to the mounting arrangement 150, relative to an axis will render the camera "balanced" with respect to that axis. In other words, the camera COG will be at a neutral point relative to that axis, preferably located on the axis, or on a horizontal or vertical plane of the axis. Centering the COG of the camera along each of the orthogonal axes will provide for a balanced camera.

FIG. 1 depicts only an example of a gimbal structure suitable for performing the stabilization techniques described in the present disclosure. The support structures and actuators and their arrangement vary between different embodiments and may change depending on, for example, intended use of the gimbal assembly. For example, the support structures arrangement may be altered to prevent possible obstruction of the payload's view in certain direction(s), adapted to accommodate larger or smaller payloads, and the like.

Figure 2:
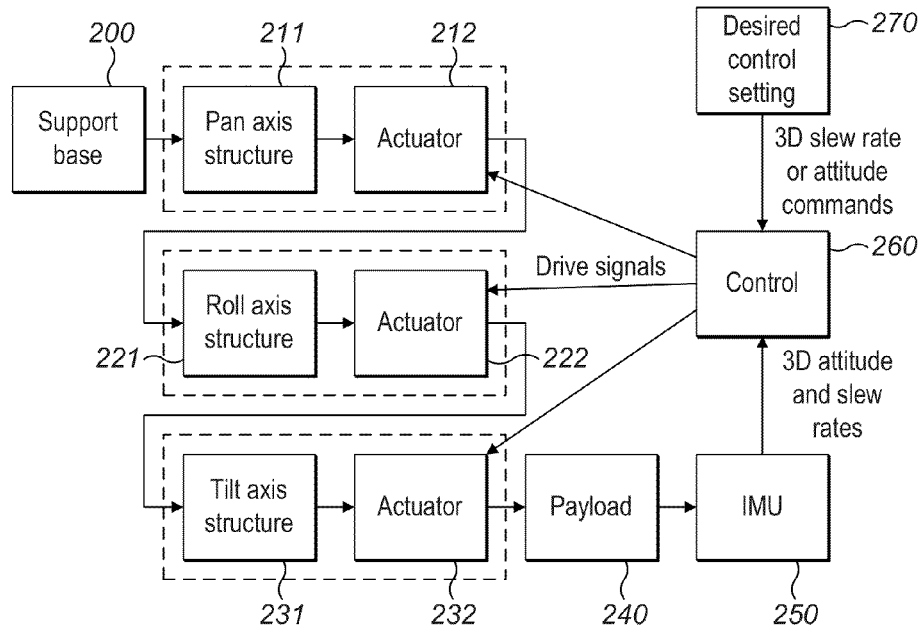
FIG. 2 is a flowchart showing the linkage of top-level elements of a 3-axis stabilization system, according to some embodiments.

FIG. 2 is a flow chart showing how the top level elements of a 3-axis gimbal structure are linked together, according to some embodiments. A support base 200 supports the rest of the gimbal structure and may be mounted to a vehicle, a fixed structure, or held by a camera operator. The support base 200 enables the entire gimbal structure to be moved to different locations during filming, while allowing the other components of the gimbal structure to rotate independently of the moving support base 200. Such an arrangement is particularly useful when camera is being moved while filming a scene.

In the exemplary embodiment of the gimbal structure of FIG. 2, the support base 200 is connected to a pan axis structure 211, which houses a pan axis actuator 212 for rotating the rest of the gimbal structure about a pan axis. Rotations about the pan axis ('panning') are rotations about a vertical axis and within a horizontal plane. In the systems disclosed herein, pan rotations are described relative to the gimbal structure.

The pan axis actuator 212 is connected to a roll axis structure 221 enabling pan rotations of the roll axis structure 221. The roll axis structure 221 houses a roll axis actuator 222 for rotating the rest of the gimbal structure about a roll axis. Rotations about the roll axis ('rolling') are rotations about an axis pointing forward relative to the gimbal structure, and are typically used for rotating the horizon.

The roll axis actuator 222 is connected to a tilt axis structure 231, enabling roll rotations of the tilt axis structure 231. The tilt axis structure 231 may house a tilt axis actuator 232 for rotating the rest of the gimbal structure about a tilt axis. Rotations about a tilt axis ('tilting') are rotations about an axis running horizontally across (left to right) of the gimbal structure, thus allowing rotations up and down relative to the gimbal structure.

The actuators 212, 222, and 232 and the supporting structures 211, 221, and 231 are connected in series to connect to a payload 240. Therefore, rotations by each of these actuators result in a corresponding rotation of the payload 240, thereby allowing full control of the payload's 240 rotations within the gimbal structure. The payload 240 is the object to be stabilized and typically is a camera.

The actuators 212, 222, and 232 are typically motors, but may be any other actuator capable of imparting rotational motion. The actuators could also be linear actuators coupled to cranks, or other mechanisms, for translating linear motion in to rotational motion. The range of rotations of the actuators within the system is preferably, but not necessarily, 360° about each respective axis. If restricted, the range of rotation may be restricted along some or all axes. Further, the range of motion may be limited by physical restrictions of the actuator and/or the surrounding support structure, for example.

The order in which the supporting structures and actuators are linked is not restricted to the order illustrated in FIG. 2 and may vary depending on, for example, an intended use or configuration of the gimbal. In FIG. 1, for example, the pan axis motor 120 is attached to the support base 110, thereby allowing the payload to pan a full 360° range, without the gimbal structure obstructing the view of the payload. However, tilting the payload substantially upward in this configuration may cause the structure to obstruct the view if the payload. Therefore, in the illustrated system 100, pan movements are prioritized over other tilt and roll movements. However, by linking the tilt axis motor to the support base before the pan axis motor instead allows a full range of unobstructed tilt motion.

Furthermore, the specific order of the actuator and axis structure may be rearranged to alleviate complications in wiring and connections. For example, if the support base 210 only comprises a handle, the pan axis actuator 212 could be mounted in the same structure 221 as the roll axis actuator 222, allowing for common wiring of the pan and roll axes actuators to be interlinked and be shorter.

An IMU (inertial measurement unit) 250 is attached to the payload 240 to monitor the motion and pointing direction of the payload 240. The IMU determines the angular position, also referred to herein as the attitude, of the payload. The attitude measurement consists of pitch (tilt), roll and yaw (pan) with respect to a reference frame, which is normally aligned to the Earth's surface. Alternatively, the attitude measurements may be made relative to the support base 200, or an arbitrary reference location and/or direction, for example on a filming set. The measurement of motion, or 'slew,' consists of measuring the rate of change of pitch, roll and yaw in the same axes. The present disclosure sometimes refers to these rates of change as a pitch (tilt) rate, a roll rate, and a yaw (pan) rate.

A control element (controller) 260 processes the attitude and motion measured by the IMU 250 to provide output drive signals in order to operate/actuate the actuators 212, 222, and 232 in closed loop feedback. The control element receives a target (desired) camera orientation from an external source 270. The external source 270 collects data concerning camera operator's intentions and either processes that data to derive the desired camera orientation, e.g., a pointing angle or slew rate, or provides the data to the control element 260 to derive the same. In a single-operator mode, the operator may indicate his or her intentions by manipulating the gimbal handles or using a thumb joystick or other controller on the gimbal. In a dual-operator mode, a remote operator may express his or her intentions using a remote controller that is in communication with the gimbal, e.g., via a radio link External disturbances on the pointing angle and/or required motion are compensated by the control loop applying correctional control signals to the actuators. These signals may be acceleration, braking, or reversal of motion by the actuators. The signals may represent a torque command such that a constant value would achieve a constant acceleration of the payload 240 acting against the physical moment of inertia. It is desirable, though not required, for the controller to achieve optimal control without overshoot or delay, while also giving the best speed response (highest control bandwidth). It is preferable for the actuators to be strong and the gimbal structure to be stiff to avoid resonances or flexure within the control bandwidth.

In some embodiments, the gimbal is simplified to fewer than 3 controllable axes. For example, a 2-axis gimbal may be used on a VTOL UAV (vertical take-off and landing unmanned aerial vehicle) as the 3rd pan axis would naturally be provided by the controlled rotation of the airframe.

Figure 3:
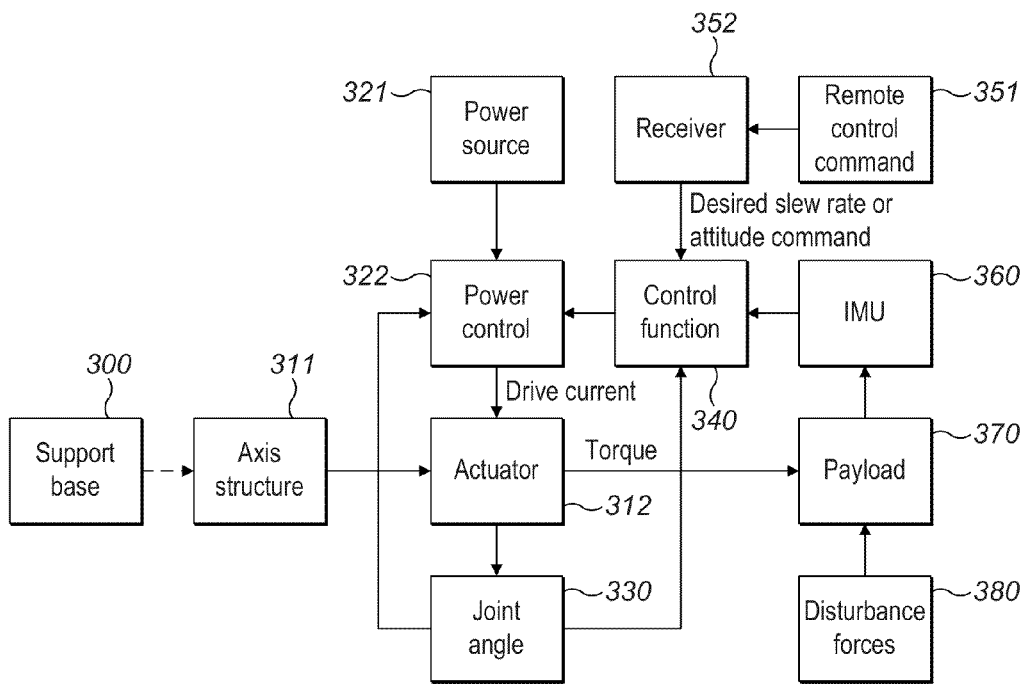
FIG. 3 is a flowchart showing the control elements for a single axis of a stabilization system, according to some embodiments.

FIG. 3 provides a detailed overview of a control system for a single axis. The motion with respect to the other axes in the gimbal is controlled by the same control system of FIG. 3 or a similar control system.

In FIG. 3, a support base 300 is connected either directly to the axis structure 311 or through intermediate elements, such as other axis structures. The axis structure 311 houses an actuator 312, which is coupled to a payload 370 to rotate it about an axis. The coupling of the actuator 312 to the payload 370 may be a direct coupling, such as a shaft, or via intermediate element(s) that are connected directly to the payload 370. The actuator 312 is capable of supplying a rotational torque to be applied to the payload 370 to cause an angular acceleration of the payload 370 dependent on its moment of inertia about the axis.

The control system of FIG. 3 further comprises an element 330 for measuring the joint angle between the actuator and its output shaft. By providing joint angle measurements, the element 330 allows the control system to determine the actual angle between the actuator and the payload to account for frictional torque forces, for example. What particular device(s) form the element 330 varies between different embodiments and includes, but is not limited to, resistive potentiometers, optical shutter wheel encoders, a magnetic Hall resolver, and/or a toothed wheel with a variable reluctance sensor.

In addition the torque forces applied to the payload 370 by the actuator 312, the payload 370 may also experience disturbance forces 380 about the same axis. Such disturbance forces may, for example, arise from friction of the actuator shaft when the support base 300 is rotated. If the payload 370 is not balanced about the axis, the disturbance forces 380 may also arise when the support base 300 is subject to lateral acceleration.

As shown in FIG. 3, the IMU 360 determines the attitude and motion of the payload 370 and outputs respective measurements to a control function 340. The combination of the payload mounted IMU 360 and control function 340 provides means for canceling any disturbance forces 380 and achieving a desired motion and/or constant set attitude with no unwanted disturbances.

In addition to the actual attitude and motion data of the payload 370, the control function 340 also receives a desired motion or pointing command, for example, supplied by a receiver 352, wirelessly communicating with a remote teleoperator via a remote control device 351. The remote operator may slew the gimbal and monitor feedback on a remote image monitor for a filming or sighting application. This allows a dual-operator mode in which one operator carries the gimbal for translational movement and the other operator, i.e., a remote operator, controls the pointing angle of the camera.

Alternatively, or in addition, both the desired motion and pointing command may be instigated by the operator carrying the gimbal using a handles based joystick or rotary knobs, such as a tilt thumbwheel control. In some embodiments, the control system of FIG. 3 uses the relative joint angle measurement 330 to command a slew by monitoring the support base motion. It is also possible for the slew and/or pointing commands to come from an artificial source such as a targeting computer, or a remote IMU that is mounted on another structure such as a monopod, tripod, a person, a vehicle, or the like.

The output of the control function 340 is amplified by a power control block which converts the current from a power source 321 (such as a rechargeable battery) into a form that is compatible with the actuator 312. The power control 322 is preferably regenerative and able to provide braking of the actuator 312 and to recover energy from a moving payload 370, thereby improving efficiency of the power control 322. For example, if a rotational motion is present in one direction and a reversal is required, then the actuator and the power control extract the rotational energy stored in the payload and replenish the power source. In some embodiments, the actuator 312 is accelerated and decelerated with equal capacity and is fully reversible.

Figure 4:
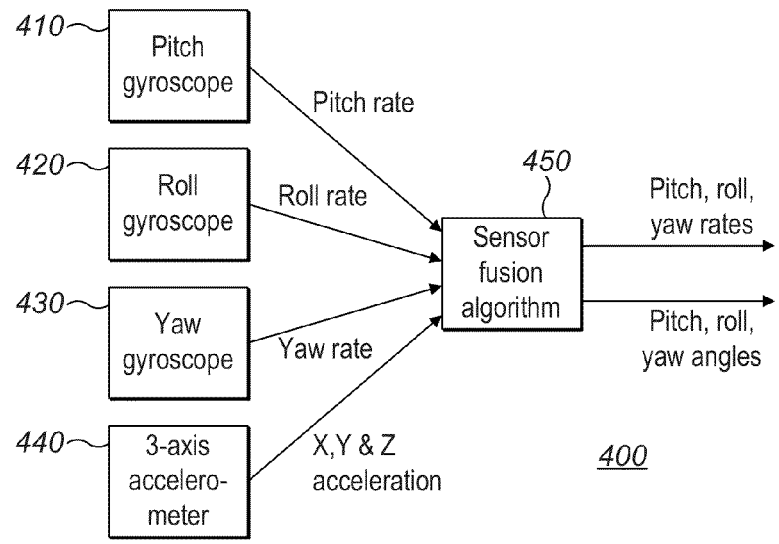
FIG. 4 is a flowchart showing the elements of a basic inertial measurement unit (IMU), according to some embodiments.

FIG. 4 illustrates elements of a basic IMU 400 for determining attitude and motion, according to some embodiments. The simple version of the basic IMU 400 provides only motion as an output, but no attitude measurements (data). Such a device includes gyroscopes 410, 420, and 430, whose outputs vary according to motion (slew) about their respective orthogonal axes, but no 3-axis accelerometer 440. For resolving the output of the gyroscopes at zero motion an algorithm is employed that averages over a long timescale and assumes short term disturbances, but substantially no movement, over the long timescale. This algorithm forms a high pass filter for subtracting the DC offset that would otherwise be observed at zero motion. The DC offset may change over time, for example, due to differences in the device temperature and ageing.

Optical gyroscopes experience very little drift with zero motion over long timescales. However, they are generally expensive and heavy, and thus may not always be suitable for hand held portable stabilization devices. As an alternative to optical gyroscopes, low cost MEM (micro-electro-mechanical) devices could be used as IMU sensors. MEM devices are fully integrated and contain all management circuitry to run the electronics providing a simple digital or analogue interface. Multiple axes may be detected by a single component, allowing for very compact sensors and IMUs, and thus enabling optimal placement on the payload. However, such low cost MEM devices may encounter drift over time due to differences in temperature and ageing. They also typically have a higher noise (random walk) than the larger, more expensive designs, such as optical gyroscopes.

To include the lower cost/size sensors into the IMU 400 and assure accuracy of the IMU 400, the drift of the lower cost/size sensors needs to be compensated for and updated frequently. For this purpose, in some embodiments, the IMU 400 includes a 3-axis accelerometer 440, which derives pitch and roll attitudes by measuring acceleration with respect to gravity. These attitude measurements are then used to correct the drift of the gyroscopes 410, 420 and 430. In particular, if the accelerometer-derived pitch and roll attitudes are constant, then it is inferred that the respective gyroscopes should be registering the zero rate.

Further, by integrating the angular motion determined from the gyroscopes, the attitude may also be derived from the gyroscopes. More specifically, changes in attitude require an increase and then decrease in angular rate for a move from a starting point to a finishing point. By integrating the curve of the angular rate (usually numerically) a rotation angle can be derived. Integration methods, such as trapezoidal, Runge-Kutta, and Simpsons, may be employed and are used given a required accuracy and/or available processing resources. The integration is performed periodically, at some interval, to commensurate with the overall control loop, for example, at 400-500 Hz. The orientation angle derived by the gyroscope integration is compared to the angle directly resolved by the 3-axis accelerometer which is references to the Earth's gravity. Periodic corrections are applied to minimize the difference between the two measurements.

As a calibrated accelerometer tends to provide more accurate readings over long timescales than drifting gyroscopes, the accelerometer readings are used to correct the gyroscopes' bias and scale. The bias is set as the error in the zero motion case and is used as a constant rotational offset (inferring motion that wasn't happening). The scale is set as the error in the magnitude of gyroscope derived deflection. Thus, it is possible to construct a sensor fusion algorithm 450, for example based on a Kalman filter and Quaternion angle representation, to derive accurate and compensated readings for motion (angular rate) and pointing direction (attitude). Generally speaking, the sensor fusion algorithm 450 takes the high bandwidth readings from the gyroscopes 410, 420, and 430 and calibrates them to increase their accuracy using the lower bandwidth readings from the accelerometer 440. The two types of sensors are complementary and sometimes their combination is done by what is referred to as a complimentary filter. A number of different structures/combinations of the sensors are possible.

As described herein, the IMU 400 is generally capable of deriving sufficiently reliable measurements of motion and attitude through the combination of different types of sensors to provide for a controlled solution. However, although by combining the sensors some of the inaccuracy effects of using cheaper, smaller sensors, are mitigated, further accuracy issues may be introduced during more complex movements. For example, if the gimbal is carried by a moving vehicle turning a corner, the described IMU 400 may mistake the radial acceleration for gravitational acceleration, thereby incorrectly assessing the motion of the payload by introducing a roll motion to the payload. Such incorrect introduction of the roll motion to the payload is undesirable particularly because deviations of the horizon from the horizontal line are easily noticeable in cinematography.

Figure 5:
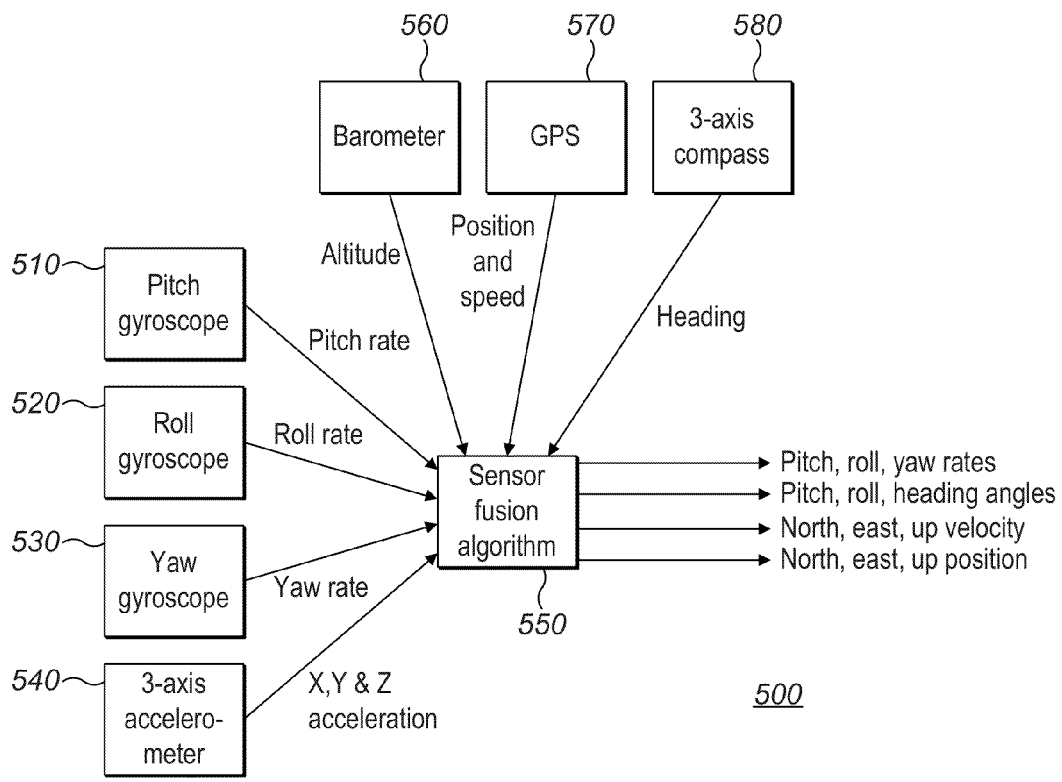
FIG. 5 is flowchart showing the elements of an enhanced IMU, according to some embodiments.

FIG. 5 shows an enhanced IMU 500, in accordance with some embodiments. Similar to the IMU 400, the IMU 500 includes gyroscopes 510, 520, and 530, whose outputs vary according to motion (slew) about their respective orthogonal axes, and 3-axis accelerometer 540. However, unlike the IMU 400, the IMU 500 also includes additional sensors to improve the IMU's performance during lateral or radial acceleration. These additional sensors may include a 3-axis compass 580 and a GPS system 570, which can be used to derive real heading, position and velocity of the gimbal. The real heading is obtained by comparing the gravitational vector with the known Earth magnetic vector. By resolving these vectors, a heading vector is obtained and then used to correct drift of the yaw-axis gyroscope 530. The heading vector provides the IMU 500 a fixed reference for comparing data obtained by the gyroscope. The IMU 400 does not have such a reference and relies on a long term averaging method to deduce a gyroscope offset bias. Further, the GPS derived velocities for East and North direction are resolved together with the heading vector to obtain an acceleration value that is used to correct erroneous measurements and/or gravitational acceleration for a radially moving gimbal base, thereby fixing the horizon drift issue.

More specifically, acceleration readings from the accelerometer 540 are integrated to derive velocity, which is then compared and corrected via the GPS derived velocity using another Kalman filter structure. These velocities may be further integrated and compared with yet another Kalman filter to the GPS position. The net result is a high bandwidth measurement of the position and velocity derived using integration of acceleration and correction with a slower set of readings from GPS. These high bandwidth readings are useful to allow higher order gimbal functions such as automatic correction of the camera's pointing angle. The accelerometer readings are corrected by the above-described process to remove the zero bias drift, similarly to the gyroscope, and enable deriving of an accurate gravity reference vector, uninfluenced by radial acceleration.

In some embodiments, the IMU 500 also includes a barometer sensor 560, which enables the IMU 500 to derive additional height change (altitude) information. In particular, the barometer-based height change information tends to be more accurate than the GPS-based height information. The barometers can resolve heights with accuracy of about 5 cm. The GPS sensors, however, typically resolve heights with accuracy of only 2.5 m CEP (circular error probable), because GPS signals are subject to environmental and reflection interference phenomena, in addition to constantly changing satellite constellations. Although the GPS sensors can provide a long term accurate data, they drift over short time frames, such as periods of seconds. In the IMU 500, the measurements derived by the barometer sensor 560 are then fused with the measurements derived by the accelerometer 540 using a Kalman filter in the manner similar to the GPS data, as described above. The derived GPS data may also be fused with the barometer data to provide for longer term corrections, for example, if there are local air pressure changes due to wind or weather.

Figure 6:
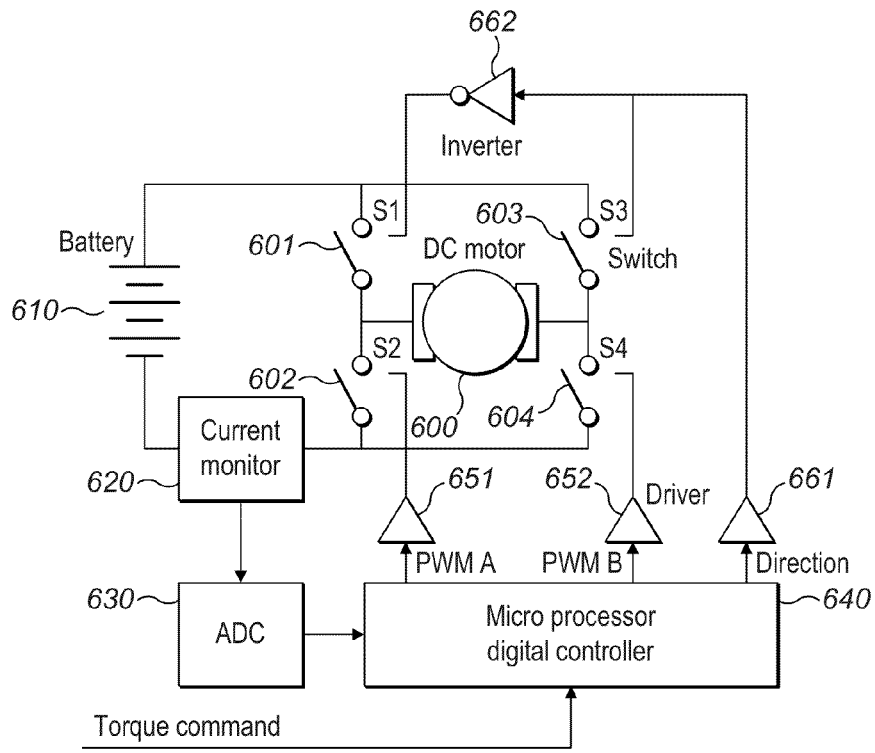
FIG. 6 is a schematic for a power control for a direct current (DC) motor, according to some embodiments.

As discussed above with respect to FIG. 2, in some embodiments, the actuators for rotating the payload are DC motors. FIG. 6 illustrates an example of a power control system for controlling a DC motor 600, according to some embodiments. A bridge containing four switches—switch S1 601, switch S2 602, switch S3 603, and switch S4 604—are arranged to provide reversible current to the motor 600 from a power source, such as a battery 610. In some embodiments, these switches are transistors, such as BJTs (bipolar junction transistors) or more commonly NMOSFETs (N-type metal-oxide-semiconductor field-effect transistors). In the arrangement of FIG. 6, if the switches S1 601 and S4 604 are closed, the motor 600 will run in a forward direction, while if switches S3 603 and S2 602 are closed, the motor 600 will run in a backward direction. If the motor 600 is in a state of motion, such as running forward, reversing the switches to trigger the backward rotation would effectively apply regenerative braking back into the power source via the dynamo effect, until physical reversal occurs.

In some embodiments, to achieve control characteristics with a minimal damped overshoot and fastest response time, the current is regulated through the motor. In particular, by modulating the duty cycle of any one switch in conjunction with the other switch for the required direction, a pulsed averaging may be achieved in combination with self-inductance of the motor, thereby reducing the applied voltage and current in a smooth way. For example, implementing a duty cycle of 50% would half the battery voltage that is needed to be applied to the motor 600. In some embodiments, the PWM frequency is set to a rate, which does not impart high switching losses and approximates a smooth current depending on the motor inductance. Further, by setting the frequency above the audible range, magneto-construction noises, otherwise polluting the soundtrack, may be reduced or removed.

Generating the gate drive for a NMOSFETs switch is typically easier on the low side power rail. Thus, in some embodiments, the bottom switches S2 602 and S4 604 are switched using pulse-width modulation ('PWM'). While the top switches S1 601 and S3 603 select a direction for the motor 600, in conjunction with the PWM switches S2 602 and S4 604, an inverter 662 ensures that only one direction is logically selected by the switches S1 601 and S3 603. A microprocessor 640 generates the PWM pulses, regulating them to achieve a desired drive current and direction. The current may be monitored via a current monitor 620, such as a shunt resistor paired with a hall device, and then fed into the microprocessor 640 using an analogue-to-digital convertor (ADC) 630.

In some embodiments, the motor 600 is designed to operate in a stalled condition and capable of sustained torque, without over heating or burning out. This may be achieved by winding the motor 600 with a sufficiently large number of turns such that the resistance is increased to a point where the full supply voltage can be applied across the motor 600 with an acceptable current. This would be the maximum torque condition, and it allows for a large number of turns which amplify the magnetic effect at a lower current.

It is preferable to match the motor 600 to the supply voltage such that a 0 to 100% duty cycle on the PWM equates to the full torque range. This will provide for inductive smoothing of the PWM signal due to the higher inductance that comes with a larger number of wire turns. At the same time, since the motion of a motor within a stabilization system is typically short (usually less than one second), a large back electromagnetic field (EMF) from the high turn motor winding is unlikely to cause a noticeably detrimental effect.

In some embodiments, the PWM switches are operated in a complementary manor. For example, if the switch S3 603 is energized for the motion in one direction, then the switches S1 601 and S2 602 are switched complementary to each other with PWM such that when the switch S1 601 is on, the switch S2 602 is off, while when the switch S1 601 is off, the switch S2 602 is on. Although this configuration requires additional PWM outputs from the microprocessor, it also provides for improved efficiency, for example, through active fly-wheeling, rather than using the body diode of the N-FET switch (which would otherwise cause a larger drop in voltage). In this configuration, when the complementary N-FET switch is turned on (during the active flywheel period), this would introduce a low resistance and, for typical currents, the voltage dropped would likely be less than 0.1V.

To provide for a quieter, or even silent, and smooth drive and/or to eliminate magneto-constriction noises polluting the filming soundtrack, the PWM is generally set to operate at higher frequencies. For example, in some embodiments, the PWM frequency is set outside the typical audible frequency range, e.g., higher than 20 kHz.

Figure 7:
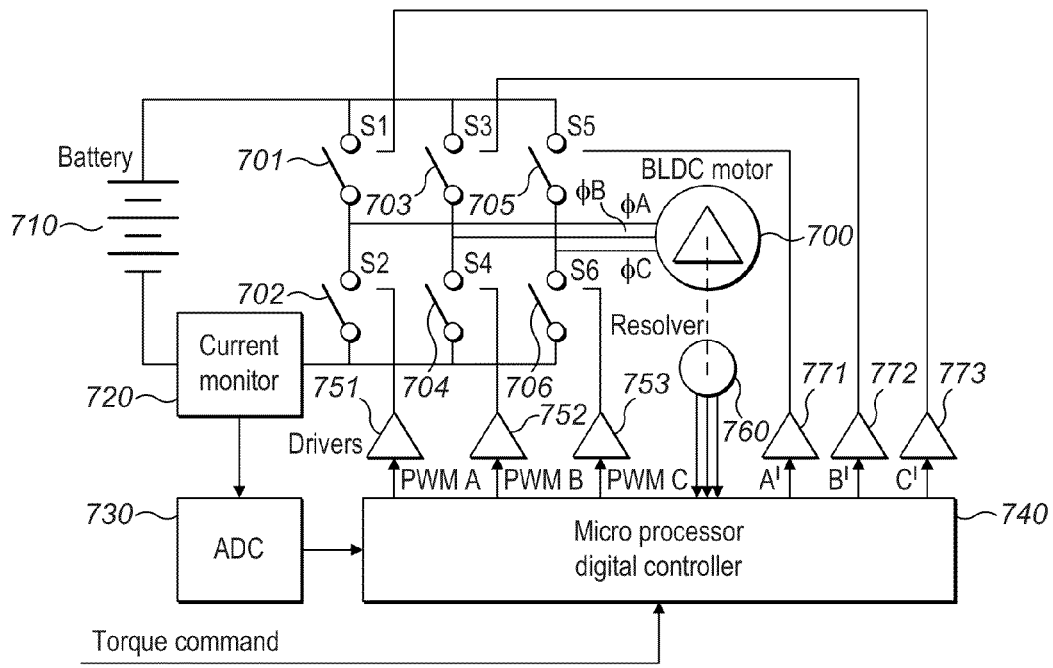
FIG. 7 is a schematic for an enhanced power control for a brushless DC motor, according to some embodiments.

In some embodiments, the actuator is a 3-phase BLDC motor (brushless DC) motor. Such a motor is generally more efficient, capable of achieving higher torque than a 2-phase motor, and is not limited by heating of commutator brushes as with a basic DC motor. FIG. 7 illustrates an example power control system for controlling a 3-phase BLDC motor 700.

A three-phase bridge is provided by six switches S1 701, S2 702, S3 703, S4 704, S5 705, and S6 706. The motor 700 is commutated by observing a resolver 760 that provides angular feedback of a position. The energization of the coils in the motor 700 is arranged to achieve forward or reverse motion using a 6-step commutation sequence with the switch pairs, in conjunction with the resolver 760. The resolver 760 may be an optical, resistive, or hall based device and may have 3 outputs to achieve a resolving code.

The remaining components of the power control system of FIG. 7 operate similarly to the components of the power control system of FIG. 6, described above. In particular, a battery 710 supplies power to the six switches 701 to 706. The current is monitored by a current monitor 720 and fed into a microprocessor 740 using an analogue-to-digital convertor (ADC) 730. Outputs A' 771, B' 772, and C' 773 of the microprocessor 740 are connected to the top switches S1 701, S3 703, and S5 705, while bottom switches S2 702, S4 704, and S6 706 are fed PWM signals from the microprocessor 740.

It should be noted that the motors 600 and 700 and the power control systems for controlling them of FIGS. 6 and 7 respectively are described for illustrative purposes only. Other types of motors and power control systems could be used, depending on the physical and/or commercial requirements. For example, the motor may be constructed as an out-runner to achieve greater torque for a given diameter by nature of magnet geometry, or the motor may be a pancake with exotica magnet arrays based on Halbach array methods to achieve even greater torque levels for a given size. A further example of a motor suitable for implementing embodiments described herein is a conventional induction machine.

Figure 8:
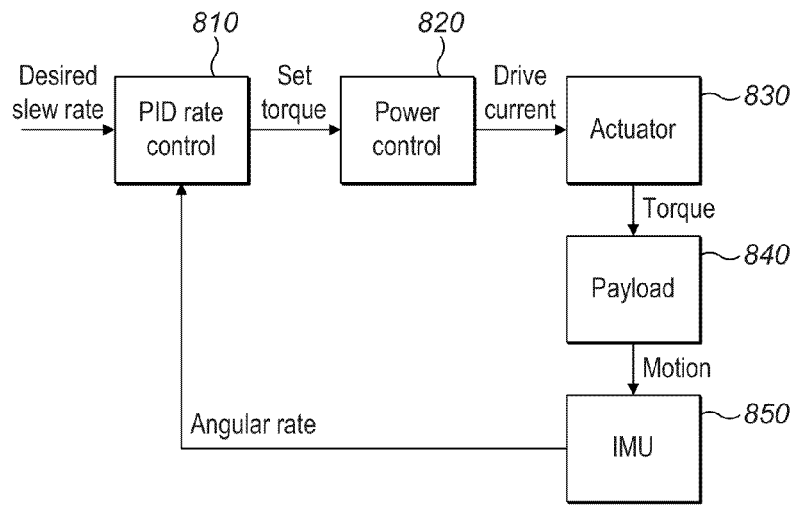
FIG. 8 is a flowchart illustrating an attitude control loop, according to some embodiments.

FIG. 8 illustrates a simple feedback loop for achieving closed loop control. An IMU 850 determines a motion, such as an angular rate, of a payload 840. At a PID (proportional-integral-derivative) rate control element 810, the measured angular rate of the payload 840 is compared with a desired slew (motion) rate provided as an input, to output a 'set-torque' command to a power control element 820. The power control element 820 provides a drive current to an actuator 830, which applies a torque to the payload 840 causing it to accelerate in the desired direction, which is again measured by the IMU 850. As a result, the loop is in closed feedback. Motion that does not equate to the desired slew rate will be amplified as an error and a compensating control signal will be provided to the power control element 820, and the actuator 830.

The control loop for FIG. 8 relies on detecting changes in motion, rather than changes in angle. Therefore, if there is a disturbance that causes the attitude to be jolted to a new position, the control loop of FIG. 8 may not be able to correct for the respective change in position.

Further, during a slow motion control, friction and stiction may interfere with the motion, causing a non-constant rate of movement. This may be undesirable, particularly during filming with a long focal length lens where control is needed to be subtle. Moreover, when using cheaper, smaller MEM sensors, the output of the sensors may be subject to random walk and noise in the determined rate, which may visibly impact their performance with unreliable drift.

Figure 9:
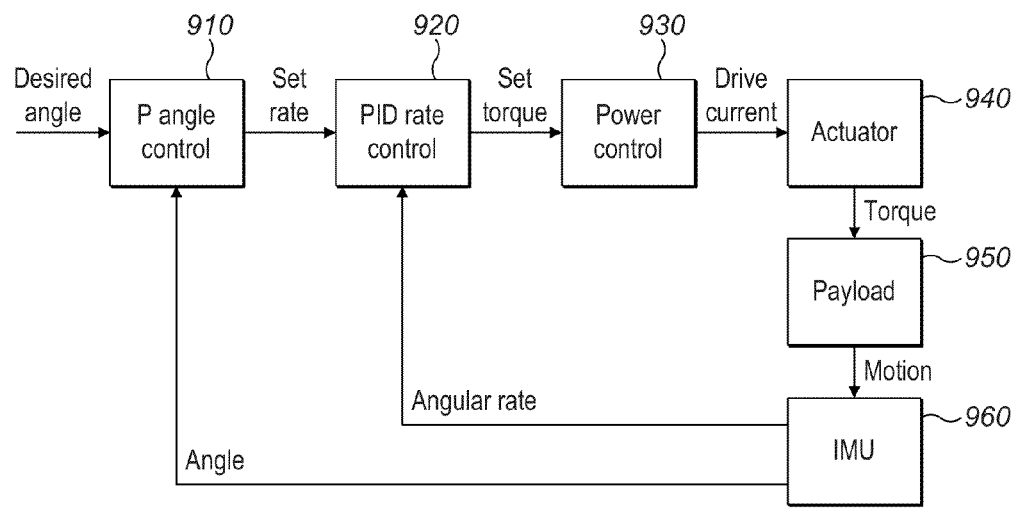
FIG. 9 is a flowchart illustrating an enhanced attitude control loop, according to some embodiments.

FIG. 9 shows an enhanced control loop that includes an angle control loop for addressing some of the problems indicated above. Similarly to the control loop of FIG. 8, in FIG. 9, a PID rate control element 920 receives, as input, a desired motion rate, as well as a detected angular rate of a payload 950 from an IMU 960. The PID rate control element 920 then sets a torque value as an input to a power control element 930, which subsequently sets the required drive current for an actuator 940 to achieve the torque value. However, unlike the attitude control loop of FIG. 8, in the control loop of FIG. 9, in addition to considering motion, desired (commanded) and detected (measured, derived) angles of the payload 950 are also considered. More specifically, a P (proportional) angle control element 910 receives, as input, a desired angle for the payload 950, as well as a detected angle of the payload 950 as determined by the IMU 960. The P angle control element 910 then sets a rate for the motion that would result in the desired angle. The proportional loop senses an error between the desired and measured angles and aims to keep this error to a minimum. In this manner, errors due to friction, stiction, and random walk are effectively cancelled out by means of the absolute attitude being the main control variable.

Figure 10:
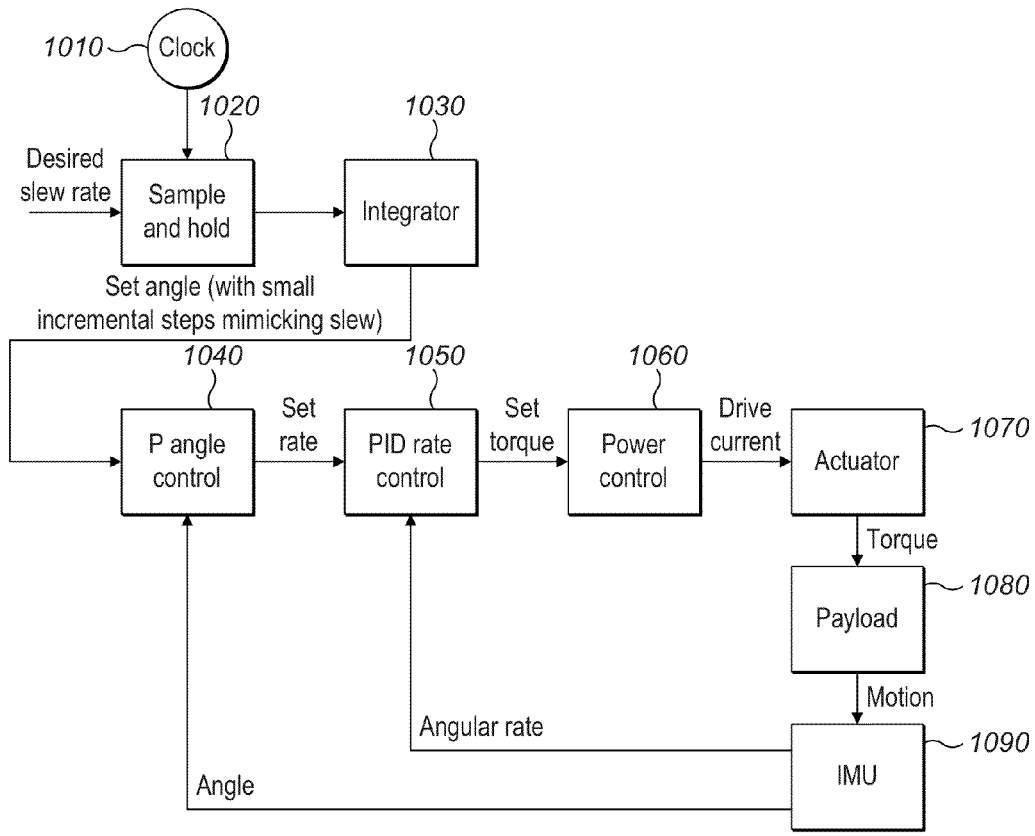
FIG. 10 is a flowchart illustrating an attitude control loop with an input mechanism, according to some embodiments.

Typical joysticks for controlling the direction of a camera determine a slew rate based on the joysticks' position. As the control loop of FIG. 9 takes an angle as input, rather than a desired slew rate, the slew rate output of a joystick should be converted to preferred angles. FIG. 10 illustrates how the control loop of FIG. 9 could be adapted to take a slew-based input. A desired slew rate from a control input, such as a joystick, is sampled at a sample and hold element 1020 at a frequent interval. This frequent interval is determined, for example, by a clock 1010. In some embodiments, the frequent interval is set between 400 Hz and 500 Hz. However, this range is exemplary only, and the frequent interval may be below 400 Hz or above 500 Hz.

The sampled slew rate is then integrated at an integrator 1030, using a constant period, which outputs a constant change in pointing angle. The change in this pointing angle mimics slew but is actually a number of sequentially different pointing commands that are closely related. These changing pointing angles are sent to a P angle control 1040, which also receives the detected angle of a payload 1080 as determined by an IMU 1090. The P angle control 1040 sets a rate for the motion that would result in the desired angle. It then sends the required rate of movement to a PID rate control 1050 unit, which also receives a detected angular rate of the payload 1080 from the IMU 1090. The PID rate control 1050 sets a torque value as an input to a power control 1060, which subsequently sets the required drive current for an actuator 1070 to achieve the torque value.

Figure 11:
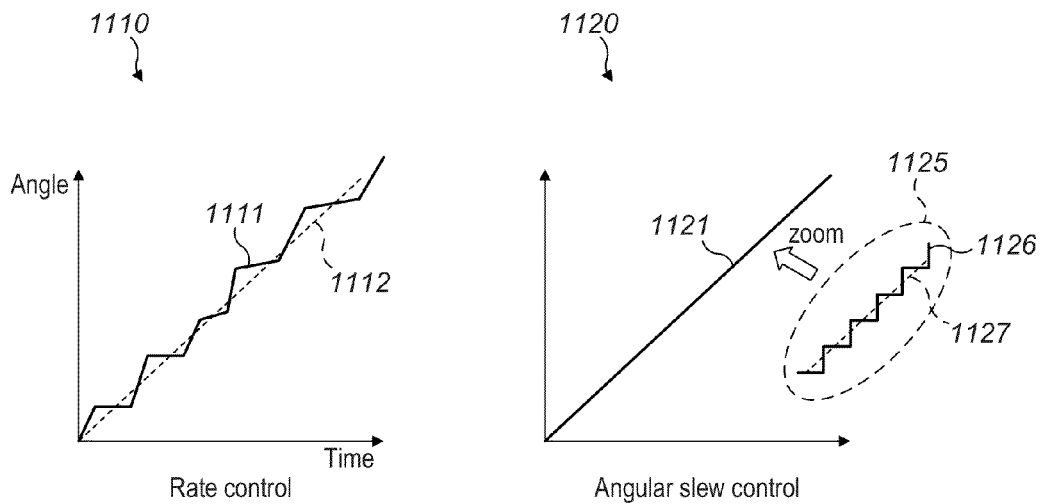
FIG. 11 shows a comparison of stabilization performance between two methods of controlling the stabilization system, according to some embodiments.

FIG. 11 illustrates the differences in performance of the rate control system illustrated in FIG. 8 and the angular slew control system illustrated in FIG. 10. Graph 1110 shows variations in angle over time for a rate control system where mechanical stiction and sensor random walk results in deviations of the resultant slew 1111 from the desired, smooth slew 1112. Graph 1120 shows the variations in angle over time for an angular slew control system. The actual motion 112, as shown, is much smoother than the corresponding motion 1111 of the graph 1110. This is because the attitude (or angle) loop automatically compensates for erratic errors and leaves only the minor ripple associated with the small steps, as shown in the magnified portion 1125 where the actual motion 1126 deviates from the desired motion 1127 by small steps.

For example, to slew at 10°/s at 500 Hz requires steps of only 0.02° per step, resulting in the appearance of very smooth movement.

Figure 12:
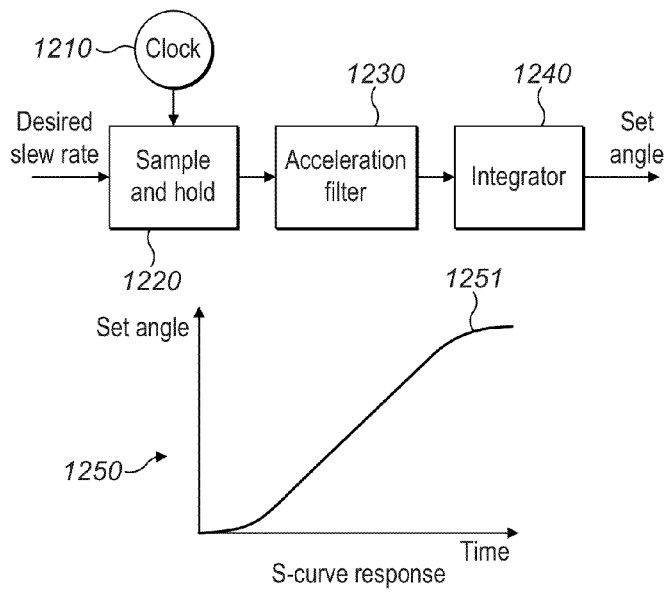
FIG. 12 illustrates an acceleration filter for modifying input commands, according to some embodiments.

In some embodiments, the input command, such as an operator command provided via a joystick, may be modified or filtered to result in a desired control effect. For example, the operator may wish to reduce the jerkiness of the input signal, and to have a gradual start of motion, followed by a period of constant motion, and then a gradual stop of motion. Such an effect may be difficult to achieve manually. FIG. 12 shows how to improve or alter the input received at the control loop by introducing a filter into the loop.

In particular, as in FIG. 10, in FIG. 12, a sample and hold element 1220 samples a desired slew rate at a frequency determined by a clock 1210. However, unlike FIG. 10, where the sampled rate is inputted directly into an integrator, in FIG. 12, the sampled rate is inputted into an acceleration filter 1230 for filtering, and only the filtered signal is then integrated at an integrator 1240, which sets the angle for the rest of the control loop. Graph 1250 shows a possible response curve 1251, illustrating how an input slew rate can be filtered to produce a more desirable, smoother result.

In some embodiments, the filter 1230 is based on a symmetrical non-causal least squares filter (similar to a Wiener filter), which has length, and thus memory or periodic samples. Each new sampled rate is introduced into the filter, which acts as a shift buffer. The filter 1230 uses a straight line fit and takes values at the mid-point of that line fit. When the buffer is full of similar samples, the fit will be the desired (commanded) input value. For example, if the buffer is full of 20 zeros, and a new sample of 10°/s value is introduced, then the slope of the least square fit will be shallow and give a mid-point underestimate of the required value. If the buffer, however, is full of 20 samples, each having a value of 10°/s, then the slope will be flat and give a projected mid-point of 10°/s as commanded. If the buffer is intermediately full of similar samples, the slope of the fit may be positive or negative and changes in a way of acceleration or deceleration—the commanded output versus the commanded input. The filter 230 may use a mixture of historical samples, which were not commanding a motion, and the more recent samples, which were commanding a motion. Once the filter 1230 is flushed with constant input values, the output is also constant and unchanging. If motion is commanded to stop, then the filter gradually flushes through to give zero at the output. The smoothing of the filter has a desired characteristic, which may be tailored by altering the length of the filter. Other, more numerically efficient filters such as Savitzky-Golay, or FIR based, may also be employed as the filter 1230.

Figure 13:
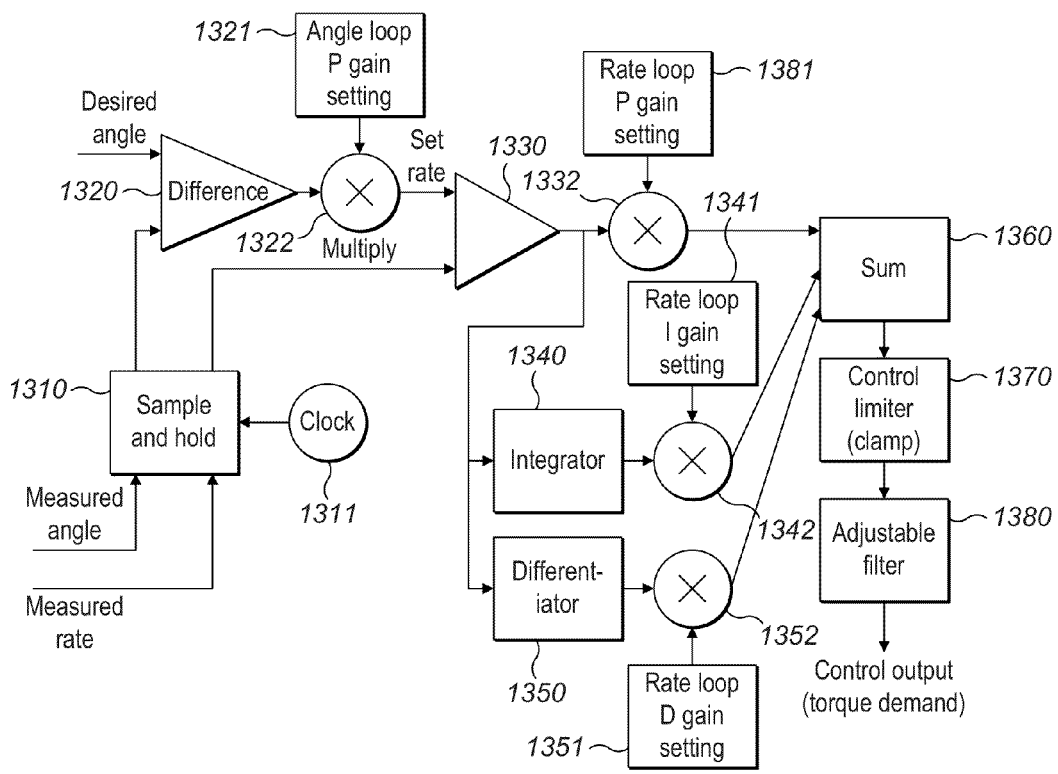
FIG. 13 is a detailed flowchart of the elements in a control loop for stabilizing a stabilization system, according to some embodiments.

FIG. 13 illustrates a more detailed diagram of a digital PID control loop, according to some embodiments. Measured IMU angular rate and angle are sampled and held at 1310 at a control loop tick rate determined by a clock 1311. In some embodiments, the control loop tick rate is in sympathy with the drive updates to the actuator. The difference between the measured angle and the desired set angle is calculated at 1320, and the resulting error is multiplied at 1322 by an angle loop P (proportional) gain 1321 to generate a command set rate for an inner loop.

The command set rate from the multiplier 1322 is subtracted at 1330 from the measured IMU angular rate 1310 and the resulting error is multiplied at 1332 by an inner P rate loop gain 1331. The same error is also integrated at 1340 and differentiated at 1350 at each clock update, where the output of the integrator 1340 is multiplied at 1342 by an integral (I) gain setting (constant) 1341, while the output of the differentiator 1350 is multiplied at 1352 by a differential (D) gain constant 1351. The results of these three multiplications 1332, 1342, and 1352 are summed at an aggregator 1360, forming a PID loop for the inner rate control.

In some embodiments, the output of the aggregator 1360 is clipped at the control limiter 1370 to reduce potential problems with saturation (such as demanding too much torque). The output may also be fed through an optional filter 1380, which is a digital low pass or notch filter based on FIR (finite impulse response) and IIR (infinite impulse response) techniques. The filter 1380 is generally configured to alleviate issues associated with structural resonance, which might otherwise disturb the control loop response. For example, the filter 1380 may be configured such as to cut off prior to a control instability point or notch out a hi-Q peak at some frequency which could cause mechanical resonance. In some embodiments, a rate limiter (not shown) is included into the outer control loop to limit the slew rates—the command set rate from the multiplier 1322. The output of the aggregator 1360 eventually reaches a control output to power an actuator and cause movement.

In some embodiments, the gain settings 1321, 1331, 1342, and 1352 of the PID loop are adjustable. In this manner, a desired control response with minimal overshoot and rapid response, without instability, may be achieved and/or adjusted. The P gain sets the overall loop gain to reduce disturbance errors. The I gain sets the accuracy for small errors on longer time scales, thereby effectively setting a time constant. With the I gain, finite errors may be cancelled out, with absoluteness. The D gain sets some predicted output, particularly helping with fast motion, and is generally used to improve the speed response. In some embodiments, the control loop is based only on the two P loops. However, in some other embodiments, the I and D gains are introduced for better performance.

Figure 14:
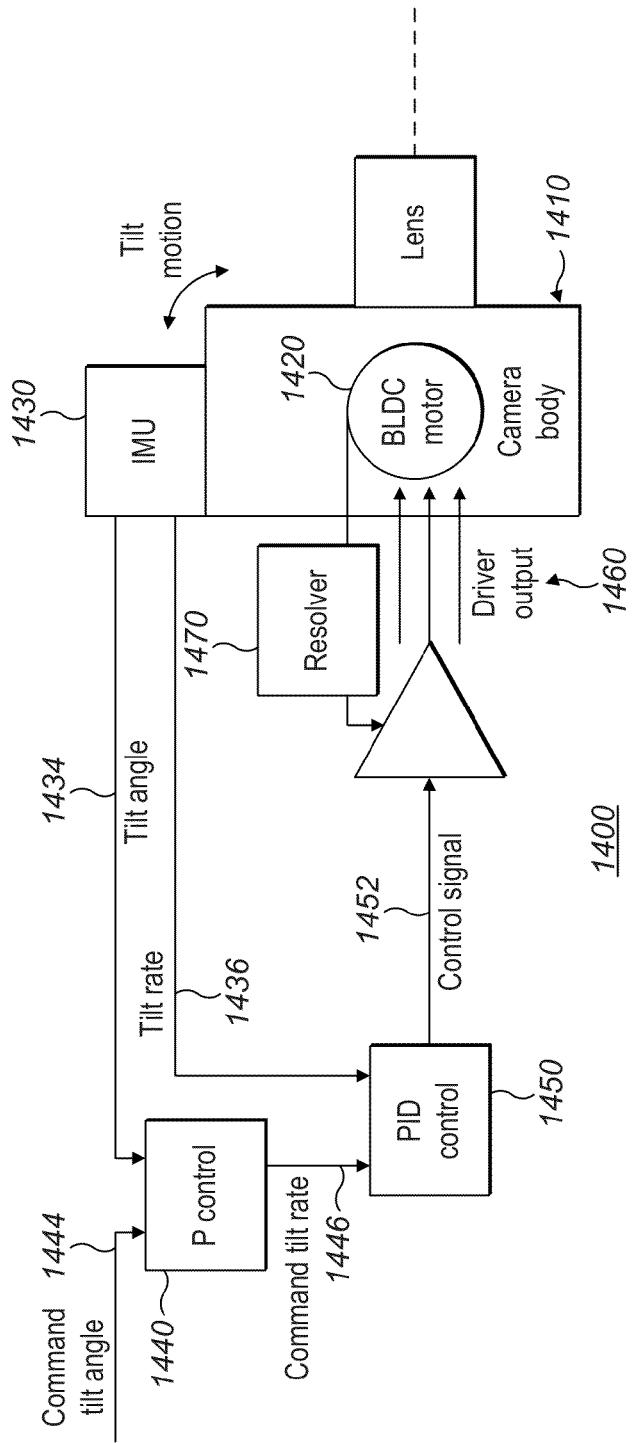
FIG. 14 is a flowchart of a single axis stabilization controller for controlling a pointing angle of a camera, according to some embodiments.

FIG. 14 illustrates a single axis stabilization control process 1400 for controlling a tilt angle of a payload, e.g., a camera 1410, housed by an active stabilization system (gimbal). The process 1400 controls the tilt angle of the camera 1410 using a brushless DC motor 1420, determining required adjustments based on measurements obtained by an IMU 1430. The IMU 1430 is mounted on the body of the camera 1410 or otherwise co-located with the camera 1410 (e.g., on a camera head) so as to be able to sense (measure, determine, provide, derive, or the like) position and velocity of the camera 1410. As discussed in more detail with respect to FIG. 9, such an IMU comprises a GPS, a 3-axis accelerometer, a 3-axis gyroscope, a 3-axis compass, and a barometer and incorporates a sensor fusion algorithm that enables the IMU 1430 to accurately derive a 3-dimensional (3D) position and a translational velocity associated with the camera. In some embodiments, the measurements acquired by the IMU are cm and cm/s accurate.

The IMU 1430 updates its measurements at a fixed update rate. Not all measurements, however, are necessarily updated at the same rate. For example, measurements derived from data sensed by the accelerometer may have a different update rate than measurements derived from data sensed by the gyroscope (e.g., 160 Hz and 500 Hz respectively). Thus, when the update rates differ for different IMU sensors, a single measurement corresponding to a lower update rate may be used in combination with different measurements corresponding to a higher update rate.

Update rates employed by the IMU overall and its components are generally depended on the technical characteristics and/or requirements of the IMU components, desired accuracy, computation characteristics, computation requirements, and/or the like. For example, typical MEM's based gyroscopes are able to provide readings upwards of 1 kHz. Further, using a lower update rate to obtain the accelerometer measurements (e.g., 160 Hz) than to obtain the gyroscope measurements (e.g., 400-500 Hz) allows the IMU to derive reliable measurements from both sensors, and also to conserve computing power and memory by not performing computations that would not otherwise improve the IMU reliability or accuracy. Also, small gimbal structures may require faster control than larger, heavy units that inherently have a greater inertial damping. Accuracy achieved by sampling a greater number of readings to enable better averaging may need to be balanced against a control bandwidth greater than frequencies which may be constituent in disturbance noise. In some circumstances, however, control achieved at lower rates, such as 50 Hz, may be sufficient, for example in an active stabilization system mounted on a vehicle.

The stabilization control process 1400 employs a closed loop electro-mechanical feedback based on the proportional-integral-differential control technique. Both the tilt angle (attitude) and the tilt rate (motion, slew) of the camera 1410 are considered to determine the tilt angle update. The stabilization control process includes two nested loops, an outer loop for correcting angle errors and an inner loop for correcting control errors and stabilizing the tilt motion.

The outer, angle-based loop includes a P control element 1440, which receives, as input, a tilt angle 1434 of the camera 1430, as detected by the IMU 1430, and a command tilt angle 1444 for the camera 1410. The command angle 1444 generally reflects intentions of the camera operator, actual or remote, at the time. More specifically, the command tilt angle 1444 may be set by a remote operator via a remote link, by the camera operator via a control device, such as a thumb joystick, or derived from the camera operator's intentions expressed by the operator lifting and steering gimbal handles, such as the handles 113 shown in FIG. 1, and determined based on the gimbal joint angles. The P control element 1440 compares the command and measured tilt angles and sets a command tilt rate 1446 for the motion that would result in the command tilt angle. In particular, P control element 1440 senses an error between the command and measured tilt angles 1444 and 1434, amplifies the error by a proportional gain constant, and feeds the amplified error into the inner loop, thereby minimizing the angle error.

The inner, rate-based closed feedback loop includes a PID control element 1450, which receives, as input, a tilt rate 1436 of the camera 1410, as detected by the IMU 1430, and the command tilt rate 1446, as set by the P control element 1440. The PID control element 1450 compares the two tilt rates to detect a control error, which it amplifies using proportional, integral, and differential constants to set a control signal 1452 (such as a torque value) for controlling movement of a brushless DC motor 1420 (or another actuator, such as a motor, a gearbox, a belt reduction drive, or the like). In particular, the output of the PID control element 1450 is fed to the brushless DC motor 1420 via a driver output element 1460 to form an overall closed loop feedback circuit, thereby causing acceleration, deceleration (brake), or a reverse movement of the brushless DC motor 1420. The driver output element 1460 outputs 3-phase currents to the motor 1420 and forms a local control loop together with an angle resolver 1470 for controlling the 3-phase currents accurately and dependent on the motor phase angle. In some embodiments, the outputs of the driver output element 1460 effectively control a torque generated by the motor 1420 to accelerate/decelerate gimbal's tilt rotation.

Generally, the stabilization control process has a fixed update rate (e.g., 400 Hz) so as to enable discrete control decisions by the stabilization controller 1400. However, the update rate may be slower, or faster, depending on a specific design of the actively stabilized gimbal. Further, in some embodiments, the stabilization control process 1400 is digital and implemented using software.

Depending on a particular application, the stabilization control process 1400 is replicated for some or all of the tilt, roll, and pan axes with the servo motors employed for the tilt, roll, and pan axes respectively. In response to the commands issued by the stabilization control processes for the respective axes, these motors operate to correct disturbances to the camera's pointing direction, automatically, such as to maintain a constant pointing angle (attitude) for each of the axes.

Accordingly, the actively stabilized gimbal (system) is designed to maintain a constant pointing angle for the respective camera based on the gyroscopic feedback, aiding the camera operator with acquiring a steady image. However, such stabilization may be too good for certain types of scenes, leading to a non-realistic scene presentation, for example, in action scenes. At the same time, without stabilization, it may be difficult for the camera operator(s) to shoot the scene successfully, causing unusable footage. To address this problem, in some embodiments, the active stabilization system supports an induced disturbance mode, which, when activated, provides for introduction of realistic disturbance into the video by adjusting the camera's pointing angle, while generally maintaining stabilization of the camera.

More specifically, to film certain scenes, the active stabilization system (gimbal) needs to be moved in space. For example, a camera operator may track a filming target with a gimbal while walking or running. Alternatively, the gimbal may be positioned on a moving vehicle. As a result of these movements, the gimbal experiences acceleration forces and rotational movements of the gimbal support structure. These acceleration forces and rotational movements are registered by the gimbal's IMU and outputted as a combination of resolvable measurements of up/down, left/right, and forward/backward accelerations, pan/tilt/roll rates, and joint angle measurements. In the active stabilization mode, the gimbal stabilizes the camera by eliminating pan/tilt/roll rate fluctuations and maintaining a constant attitude within the limits of the system bandwidth, thereby providing for a steady image. In the induced disturbance mode, however, a controlled corruption is applied to the stabilization process. The controlled corruption enables the operator to create an illusion that the scene was filmed in a first-person view, immersing the watching audience into the scene with more realism, while the system continues to maintain accurate stabilization allowing the camera operator to successfully film the scene.

Figure 15A:
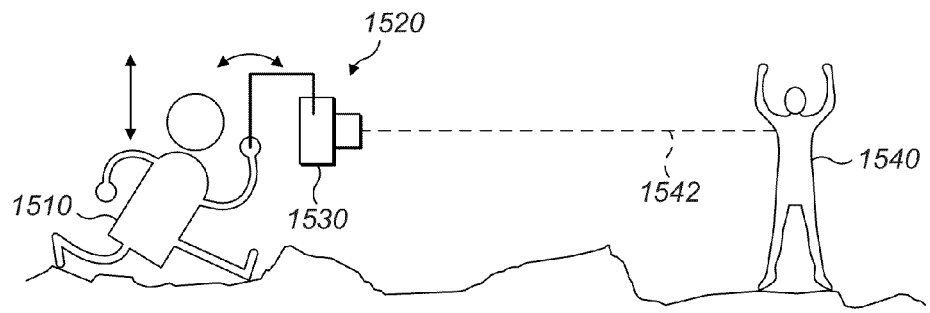
FIGS. 15A and 15B illustrate differences between an active stabilization system without an induced disturbance mode and an active stabilization system with the activate induced disturbance mode, according to some embodiments.
Figure 15B:
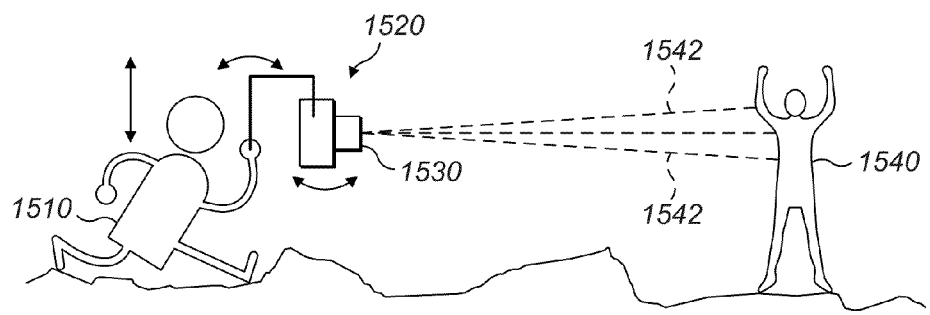

FIGS. 15A and 15B illustrate differences between a gimbal in an active stabilization mode, without controlled disturbance being introduced, and a gimbal that has an induced disturbance mode activated. More specifically, in both FIGS. 15A and 15B, a camera operator 1510 is shown running, while holding a gimbal 1520 and filming a filming target 1540. Both the camera operator 1510 and the gimbal 1520 experience up/down accelerations caused by the operator's running. In FIG. 15A, the inducted disturbance mode has not been activated on the gimbal 1520. Accordingly, the gimbal 1520 simply stabilizes the pointing direction of the camera, thus maintaining a constant pointing angle. Consequently, although the camera operator and the gimbal 1520 are moving up and down, as the camera operator is running, a camera's focusing point 1542 remains substantially constant.

In contrast, in FIG. 15B, the focusing point 1542 of the camera 1530 is moving up and down responsive to the operator's running, thus creating an illusion of a first-person view.

This effect is achieved by controllably adjusting the pointing angle of the camera (a tilt angle in the shown scenario) responsive to the camera operator's up and down accelerations, while maintaining the camera stabilization. That is, in the induced disturbance mode, the gimbal mimics an illusion of real movement (here up and down movement) by altering/adjusting the pointing angle of the camera by small amounts responsive to the actual movements of the gimbal.

Figure 16:
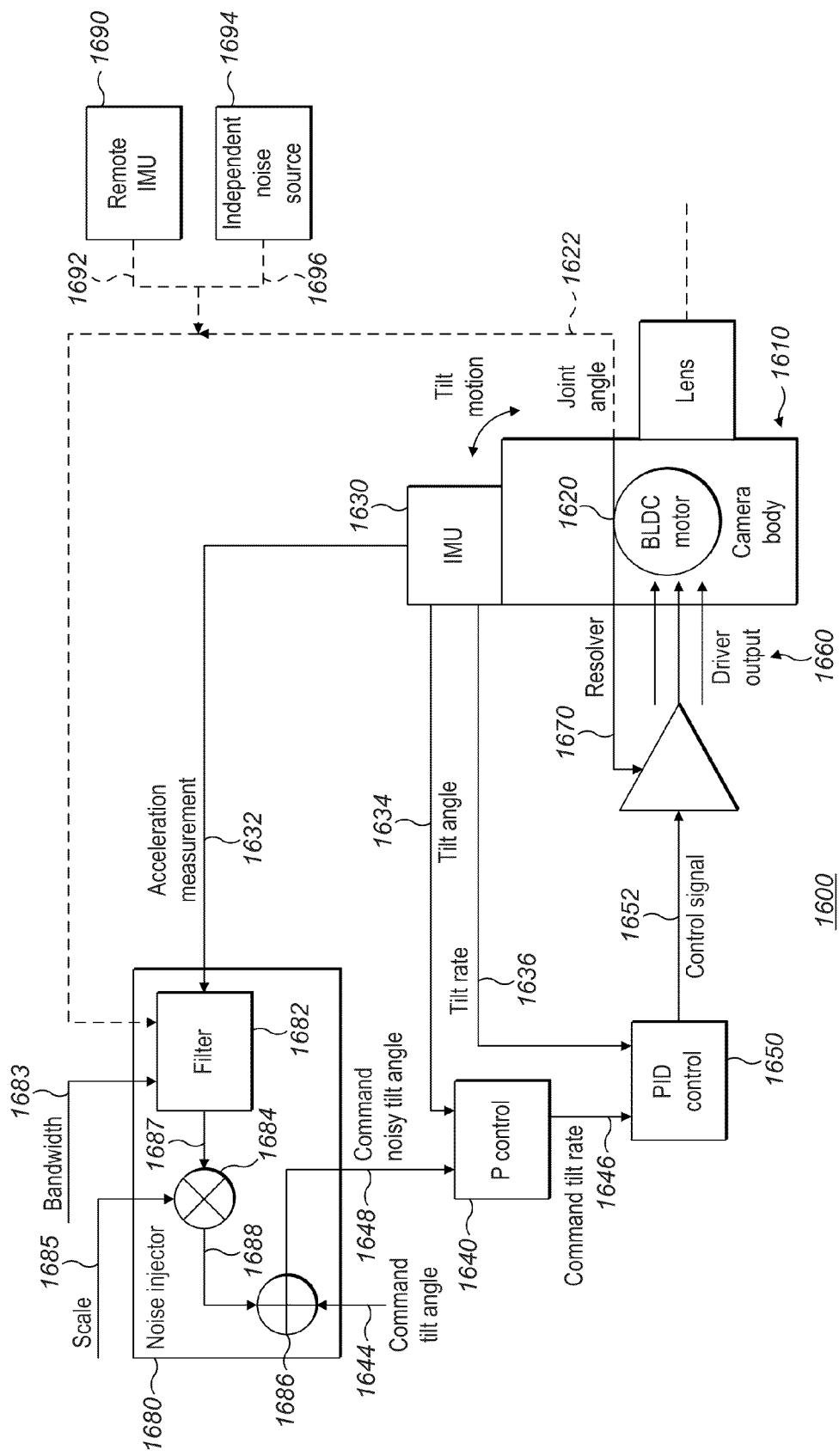
FIG. 16 is a flowchart of a single axis stabilization controller modified to include a noise injector, according to some embodiments.

FIG. 16 shows suitable modifications for a single axis (tilt axis) stabilization control process (controller), enabling controllable adjustments of the camera tilt angle responsive to gimbal's movements to introduce controlled disturbance into the stabilization process. In particular, an active stabilization controller 1600 includes a noise injector 1680 that injects noise/disturbance into the stabilization process responsive to detected transitory movements of the gimbal, thus causing adjustment of the camera's tilt angle set by the camera operator(s), for example, by manipulating the gimbal handles, using a thumb joystick or other controller on the gimbal, or using a remote controller. Similar modifications can be made to a pan axis stabilization control process for controlling the pan angle of the camera and to a roll axis stabilization control process for controlling the roll angle of the camera More specifically, similarly to the stabilization control process 1400, the stabilization control process (controller) 1600, implements the inner PID loop including a PID control element 1650, which receives, as input, a tilt rate 1636 of a camera 1610, as detected by an IMU 1630, and a command tilt rate 1646 set by a P control element 1640. The PID control element 1650 compares the two tilt rates to detect a control error, which it amplifies using proportional, integral, and differential constants to set a control signal 1652 for controlling movement of a brushless DC motor 1620. The output of the PID control element 1650 is then fed to the brushless DC motor 1620 via a driver output element 1660 to form an overall closed loop feedback circuit, thereby causing acceleration, deceleration (brake), or a reverse movement of the brushless DC motor 1620.

Further, similarly to the stabilization control process 1400, the stabilization control process 1600 implements the outer P-loop with a P control element 1640, which receives, as input, a tilt angle 1634 of the camera 1610 detected by the IMU 1630. However, in the outer P-loop of FIG. 14, the P control element 1440 compares the tilt angle 1434 directly to the command tilt angle 1444, representing an angle commanded by the camera operator, e.g., via a remote controller, to issue the command tilt rate 1446. In contrast, the P control element 1640 compares the tilt angle 1634 to a noisy command tilt angle 1648 to issue the command tilt rate 1646 for the PID control element 1650. The noisy command tilt angle 1648 is generally the command tilt angle 1644 that has been modified by the noise injector 1680 so as to create an illusion of disturbance or real movement, without compromising stabilization of the camera 1610.

As described herein, the illusion of disturbance or real movement is mimicked/created by altering the camera's pointing angles by a small amount (noise). For angular changes, a perceived camera displacement can be approximated by the following equation:

$$\text{displacement} = \tan(d\theta) \times \text{distance} \quad (1),$$

where $d\theta$ is the angular displacement and distance is the distance from the camera to the filming target. By scaling the value of the angular displacement $d\theta$, a different perceived displacement, not dependent on the real distance between the camera and the filming target, may be achieved. Rather, the perceived displacement may be viewed as related to the zoom set-up on the lens system.

Camera's actual displacements are transitory, as the camera eventually returns to its original position. In this manner, the camera's displacement is similar to acceleration. Thus, in some embodiments, noise associated with the movements of the camera operator's (vehicle's, or other entity transporting the gimbal) is approximated based on acceleration measurements 1632 acquired by an IMU 1630 co-located with the camera 1610. For example, up and down accelerations of the gimbal provide transitory up/down accelerations, which are adjustable by a scaling factor (as described below in greater detail) to determine the tilt noise.

More specifically, the IMU 1630 measures accelerations of the IMU body and resolves the resulting measurements to up/down, left/right, and forward/backward accelerations in relation to the actual field of view of the camera, irrespective of the pointing angle of the camera. In other words, the IMU resolves the up/down acceleration measurements along a line from the bottom to the top of the camera, while resolving the left/right acceleration measurements along a line connecting the two sides of the camera. For example, if the camera is pointing straight downward, the up/down acceleration will be in a plane parallel to the ground. In FIG. 1600, the noise injector 1680 samples (acquires, obtains, receives, or the like) the up/down acceleration measurements 1632 of the IMU 1630 at a fixed update rate, as set by a clock (not shown). This update rate effectively defines a control loop period/cycle of the noise injector 1680. In some embodiments, the update rate of the noise injector 1680 corresponds to the general update rate of the controller 1600 and is set, for example, at 400 Hz-500 Hz.

The Earth's gravitational field causes a constant acceleration being registered as a part of the obtained acceleration measurements 1632. Since the constant acceleration component will vary depending on the current tilt angle of the camera, such acceleration is resolved dependent on the camera's tilt angle. Similarly, if the IMU is rolled or tilted from a horizontal pointing direction then the 3-axis accelerometer will resolve, in the respective axis(es), a portion of the gravity vector giving rise to a constant value together with superimposed noise. The constant acceleration is not transitory, and thus does not contribute to the noise associated with the movement. Accordingly, to determine noise associated with the movement, the constant acceleration needs to be removed from the raw acceleration measurements 1632, or in other words, the transitory acceleration needs to be extracted from the raw acceleration measurements 1632.

To extract the transitory acceleration, in some embodiments, the noise injector includes a filter 1682. Generally speaking, the filter 1682 outputs a value indicative of motion, approximating the transitory acceleration. If the filter 1682 outputs zero or no value, then it is presumed that there is no transitory motion in relation to the tilt axis. The filter 1683 is recursive (in relation to each update cycle) and characterized by a bandwidth 1683 defining a range of frequencies it passes. Further, in some embodiments, the bandwidth 1683 is adjustable to enable tuning of the strength and/or nature of the noise/disturbance introduced into the stabilization process. For example, the bandwidth may be adjusted such that only substantial (high frequency) accelerations associated with the movement contribute to the noise determination. That is, not all transitory accelerations would contribute to the noise.

In some embodiments, the filter 1682 is a high pass filter (HPF) so as to remove the DC component from the resulting measurements. However, other more complex filters, such as a finite impulse response filter (FIR), an infinite impulse response filter (IIR), or the like may be employed to create more complex filter responses, for example, to add certain desired features to the resulting noise output.

Figure 17:
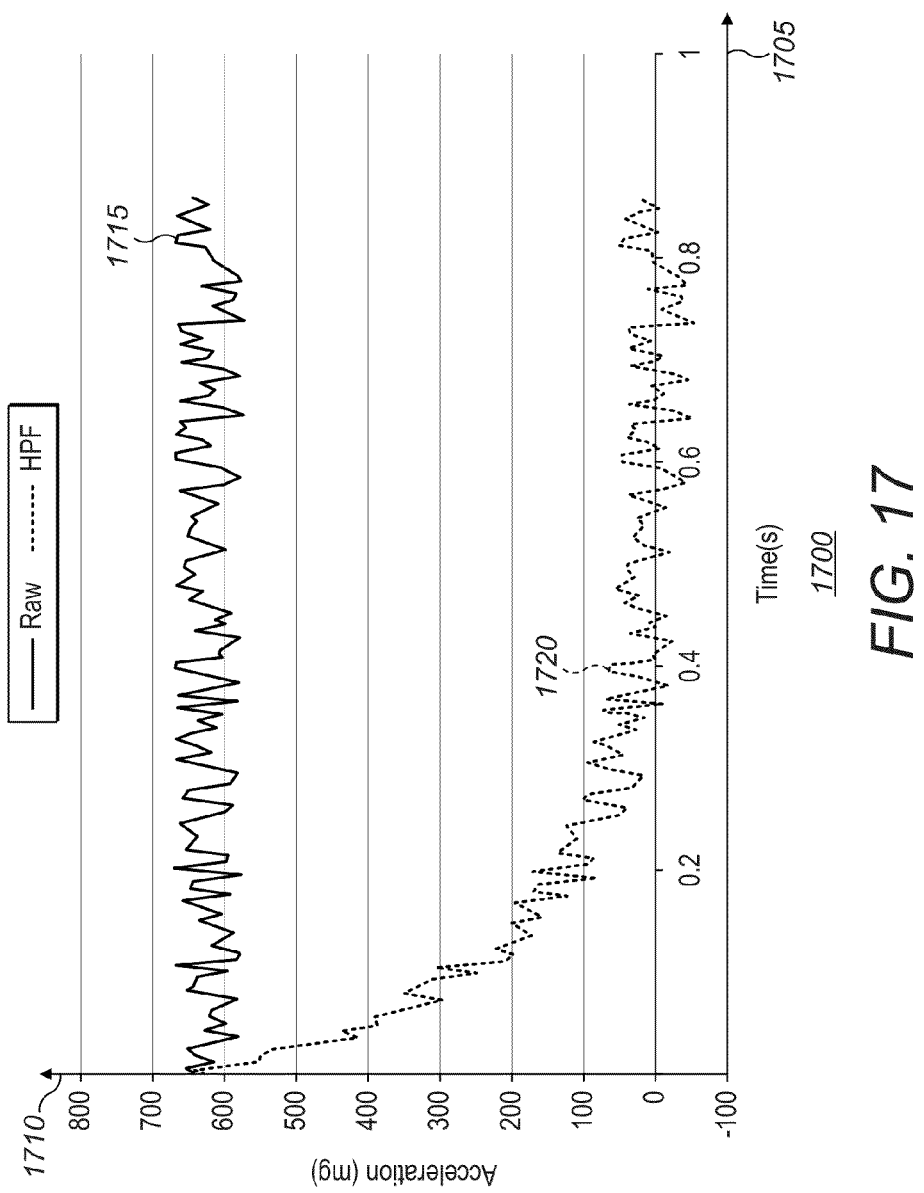
FIG. 17 illustrates a graph showing an effect of a high-pass filtering on acceleration measurements, according to some embodiments.

FIG. 17 illustrates the effect of an exemplary HPF filter on the raw acceleration measurements obtained by the IMU. In particular, FIG. 17 shows a graph 1700 depicting raw acceleration measurements 1715 and filtered out acceleration measurements 1720 over time 1705. Both lines 1715 and 1720 start at approximately the same point of about 650 mg at the time 0 s. As the time progresses, the raw acceleration measurements 1715 vary from approximately 575 mg to approximately 675 mg. The filtered out measurements 1720, however, first rapidly decrease towards zero. Then, at approximately 0.35 s the filtered out measurements start substantially replicating the changes of the raw acceleration measurements 1715, but at values varying about the 0 mg line. That is, in about 0.35 s the recursive nature of the filter enables the filter to start consistently removing the constant acceleration component from the raw acceleration measurements and arrive to the noise values representative of the movement corresponding to the raw acceleration measurements.

Returning to FIG. 16, after the constant acceleration has been filtered out, the resulting transitory acceleration value 1687 is scaled. A scale factor 1685 and the transitory acceleration value 1687 are multiplied at 1684 to derive a noise value (measurement, component, or the like) 1688. The scale factor 1685 is adjustable and its value may depend on the strength and nature of the desired noise/disturbance, technical characteristic of the gimbal, particular requirements, and the like. For example, scaling values may be chosen to provide a realistic representation of a certain type of behavior, e.g., a walking gait of a person. Generally, a calmer behavior, such as walking, would require a smaller scale, while a more intense behavior, such as jumping, would require a larger scale.

An aggregator 1686 sums the noise value 1688 and the command tilt angle 1644 to determine a noisy command tilt angle 1648. The noise injector 1680 then outputs the noisy command tilt angle 1648 to the P control element 1640 for stabilization.

Accordingly, the controller 1600 is able to instruct camera's tilt motions in sympathy with transitory accelerations of the gimbal, where the tilt motions may be adjusted using tuning parameters (such as the scale factor and the filter bandwidth) for consistent behavior. Camera's pan and roll motions can be instructed in a similar manner. For example, camera's pan motion could be determined and instructed based on lateral accelerations (left/right).

Moreover, the noise-induced motion can be applied to one, two, or all three control axes—pan, tilt, and roll axes. By setting the scale factor for any of the control axes to zero, the perturbation for that axis is disabled. Typically though, the induced (injected) disturbance is introduced in relation to the pan and/or tilt axes. However, in certain scenarios, the induced disturbance is also introduced in relation to a roll axis, e.g., a camera operator filming while on a rocking boat.

The scale factors and/or filters may require different tuning for different axes, such as depended on the gimbal format, its technical specifications, a desired effect, camera operator's preferences, and the like. For example, the pan axis can have a higher inertia than the tilt axis. Thus, a greater gain would be required for the pan axis than for the tilt axis to achieve a similar response at a certain frequency.

The scale factors are also adjustable to provide for the pointing angle adjustments in a direction opposite to a direction indicated by the measurements derived in association with the gimbal's movement, such as a downward tilt based on an upward acceleration, or in the same direction (an inverted scale factor), such as an upward tilt based on an upward acceleration. Different effects may be desired and set for different axes.

In some embodiments, the scale factors and/or filters are adjustable by the camera operator. They may be adjusted before the filming starts or during filming, when desired adjustments become more obvious. Both the camera operator and remote operator can make adjustments. Further, the active stabilization system may include default values for the scale factors and/or the filters, including different default values for different filming scenarios, such as an action scene, a camera mounted on a vehicle, a running camera operator, a rocking boat, and others.

In some embodiments, a vector sum of the total accelerations for all axes (pan, tilt, and roll) is determined and used to adjust the camera's pointing angle for a single axis (pan, tilt, or roll). For example, in FIG. 16, the IMU 1630 provides the vector sum to the tilt noise injector 1680, which will generate a noise value for adjusting the command tilt angle 1644 based on the combined acceleration measurements. Alternatively, a noise value is generated for each axis by the respective noise generator, the resulting noise values are summed up and used to adjust a selected pan, tilt, and/or roll angle. This approach enables a more controlled result for a known behavior. For example, running forward on a flat surface is mainly characterized by up and down movements. By summing up the acceleration measurements (or the resulting noise values) for all axes and introducing only up-down disturbance (adjusting the tilt angle only) based on such measurements, a better synchronization of the disturbance and the camera operator's movements may be achieved, providing for a natural simulation of a first-person running perspective.

In some embodiments, induced disturbance/noise, representative of the gimbal's movements, can also be emulated by monitoring the gimbal joint angles. Generally speaking, this process is similar to measuring rotational movements of the camera that is hard-mounted or held by an operator. In some embodiments, joint angle measurements 1622 are obtained by a resolver of the gimbal's actuator, such as the BLDC motor 1620, and sampled by the noise injector 1680. By filtering the joint angle measurements, a symmetrical jitter or shake signal is derived. This signal is introduced at a controlled level in a manner similar to the acceleration derived noise. That is, similar to the transitory acceleration, the jitter values are scaled to derive the noise value 1688. The filter 1682, its bandwidth 1683, and/or the scale factor 1685 are used by the noise injector 1680 to process the joint angle measurements 1622 and may differ or be the same for different axes and/or be the same as or differ from respectively the filter 1682, its bandwidth 1683, and/or the scale factor 1685 used to process the acceleration measurements 1632.

Other measurements associated with the movements of the stabilization system may be used in the similar manner, but instead of the acceleration measurements or joint angle measurements, to derive noise values. Such measurements include, but are not limited to, velocity, displacement, rotational noise from the gimbal actuator(s), such as the BLDC motor 1620, distance measurements (such as a vertical distance to a reference point, horizontal distance to a reference point, or the like measured by a distance sensor), barometric measurements, GPS data, and the like. Generally, any measurement associated with the gimbal's movements that over-time reflect oscillatory features and/or rhythm of the movement are suitable, though will provide a different level of accuracy. What type of measurements is used to derive the noise values may depend on a current pointing angle of the camera, current position and/or orientation of the gimbal in space and in relation to the camera, technical characteristics and/or capabilities of the gimbal (active stabilization system), and the like.

Further, in some embodiments, accelerations measured in other parts of the camera system, but in association with the movement experienced by the gimbal, are used. For example, a gimbal supported on a boom from a camera car, although moving with the car, is unlikely to measure appreciably high frequency acceleration noise in association with the movement. By mounting an accelerometer or an IMU 1690 remotely, but in association with the camera system, for example, on a car chassis, more realistic acceleration measurements 1692 will be obtained. Such acceleration measurements are processed in the same manner as the acceleration measurement 1632, as discussed herein. In some embodiments, the remote raw acceleration measurements 1692 and corresponding raw acceleration measurements 1632 (such as measurements obtained at the same point in time for corresponding axes) are combined and processed by the noise injector 1680 to derive the noisy command tilt 1648.

Also, in some embodiments, pre-recorded (e.g., recorded during a previous take of the same scene) or pre-generated accelerations 1694 are introduced into the captured video. For example, data could be synthesized to simulate a particular disturbance, such as an earthquake, a rocking boat, a roller coaster, or others. Then, during filming, these independent accelerations 1692 are combined with the raw acceleration measurements obtained by the IMU 1630 to link the outside disturbance with the real measured accelerations, thus providing for a realistic effect at the point of shooting. As pre-recorded (pre-generated) accelerations may be processed in advance to extract the transitory component, in some embodiments, the pre-recorded (pre-generated) accelerations 1696 are introduced post-filter 1682 or post-multiplier 1684. Yet, in some embodiments, a pre-recorded (pre-generated) acceleration measurement 1696 is combined with a real measured/transitory/scaled acceleration measurement only when real measured/transitory/scaled acceleration measurement is above or below a certain pre-set threshold.

Alternatively, or in addition, the independent accelerations may be introduced for one (or two) of the axes in parallel with the measured accelerations for the other one/two (or one) axes. In this manner, a particular disturbance may be realistically introduced, without the camera operator having to experience such a disturbance. For example, to simulate a scenario of a person walking on a rocking boat, ship, or the like, a disturbance emulating the rocking motion may be introduced for the roll axis, while the real acceleration measurements corresponding to the camera operator's walking movement may be introduced for the tilt axis. In this manner, a realistic first-person view emulation of the person walking on a rocking boat is achieved, without the camera operator having to walk on the rocking boat. Yet, in some embodiments, only independent acceleration measurements are used to introduce controlled disturbance(s) for one or more of the pan, tilt, and roll axes.

In FIG. 16, the noise/disturbance is introduced at the level of the outer angle-based P control loop. That is, the noise value is provided by the noise injector 1680 and is expressed as an angle. However, in some embodiments, the noise is introduced instead at the level of the inner rate-based PID control rate and is expressed as an angular rate for modifying (summing up with) the commanded tilt rate 1646, instead of the command tilt angle 1644. In such embodiments, the commanded tilt angle 1644 is inputted into the P control without modifications or adjustments for noise. Yet, in some embodiments, the noise value is introduced to modify the control signal 1652 and is expressed as a torque value, which is summed up with the control signal to instruct a noisy movement. In such embodiments, the outer and inner control loops are executed in the same manner as the active stabilization loops, such as described with respect to FIG. 14. The stabilization process is circumvented by corrupting the control (torque) command 1652 outputted by the rate-based loop to introduce a controlled disturbance into the system. In some embodiments, a drive current is used instead of the torque value to inject the noise. Generally, the drive current is a measurement related to the torque, although is of a different scale. Further, a torque measurement may be inferred from a corresponding drive current measurement, and vice versa. Thus, in some embodiments, the noise is injected into the drive current. The methodologies described herein for deriving noise values in the form of a noise angle, based on the acceleration and joint angle measurements, are similarly applicable for deriving noise values in the form of an angular rate, a torque command, or a drive current.

Further, in FIG. 16, the noise/disturbance is introduced by the noise injector 1680 that adjusts the command tilt angle 1644 and provides the noisy command tilt angle 1648 to the P control element 1640 for further stabilization processing. However, in some embodiments, the noise is determined and introduced by the IMU 1630 instead, although in a similar manner. In such embodiments, the IMU 1630 provides the generated noise value to the P control element for summing it with the command tilt angle. Yet in some other embodiments, the noise is introduced at the PID loop level. That is, the noise value 1688 is introduced to modify the command tilt rate 1646, instead of the command tilt angle 1644. Alternatively, in some embodiments, the IMU 1630 determines noise values to controllably corrupt measurements acquired by the IMU 1630, so as to introduce the controlled disturbance.

Figure 18:
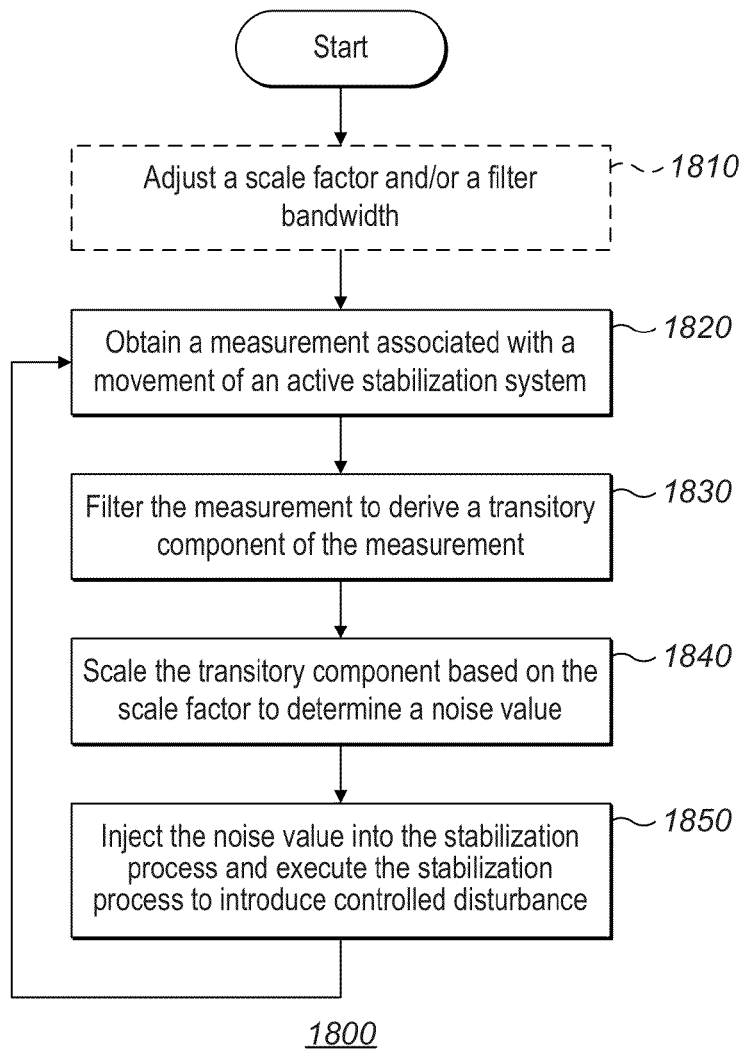
FIG. 18 illustrates a flowchart of a method for introducing controlled disturbance into an active stabilization system, according to some embodiments.

FIG. 18 illustrates a flowchart of a method 1800 for introducing controlled disturbance into an active stabilization system, according to some embodiments. As shown, the method 1800 is performed for one of the pan, tilt, and roll axes. However, it is similarly performed for each of the axes and may be performed in parallel for two or all three axes. That is, the method 1800 could be performed to introduce the controlled disturbance for each and every of the pan, tilt, and roll axes, responsive to the movement measurements associated with these axes.

The method 1800 starts with step 1810 of adjusting a scale factor and/or filter bandwidth, such as the scale factor 1685 and the bandwidth 1683 discussed with respect to FIG. 16. By adjusting the scale factor and/or the filter bandwidth, the camera operator influences the nature and strength of the introduced disturbance/noise. Further, by setting the scale factor to zero for one or more axes, the camera operator may effectively deactivate the induced disturbance mode for those axes. In other words, no disturbance will be introduced for such selected axes. As indicated in FIG. 18, step 1810 is optional, as the camera operator may, for example, be satisfied with the previously selected filter and scale settings.

At step 1820, a measurement associated with a movement of the active stabilization system (gimbal) is derived, measured, sensed, acquired, or otherwise obtained. As discussed with respect to FIG. 16, such a measurement may be an acceleration measurement derived by the system's IMU for one of the axes, an acceleration measurement derived by a remote IMU detecting measurements in association with the gimbal's movement (e.g., an IMU mounted on a chassis of a vehicle carrying the gimbal during filming), and a gimbal joint angle measurement for one of the axes. Additionally, or alternatively, velocity, displacement, rotational noise from the gimbal actuator(s), distance, barometric data, GPS data, height and/or distance measurements and related changes (for example, obtained by a designated range or optical flow sensor) and other measurements may serve as source(s) for deriving the noise. In some embodiments, certain features incorporated into the camera may serve as a source of noise, such as a built-in anti-shake system (optical and/or digital).

At step 1830, the measurement is filtered to remove the DC component and derive a transitory component of the measurement, or in other words, the component indicative of the transitory motion. As described with respect to FIG. 16, the transitory component may, for example, be a transitory acceleration derived using a filter, which enables removal of the constant acceleration from the measured acceleration. The filter may be adjusted to derive transitory component of higher frequency accelerations only. The transitory component may also be a jitter value derived by applying the filter to a joint angle measurement.

At step 1840, the transitory component, derived at step 1830, is scaled by a scale factor. In some embodiments, the transitory component is multiplied by the scale factor to derive a noise value. However, other approaches to scaling may be employed instead or additionally, such as limiting the output noise value by a certain maximum value, looking up a scaled value in a table for the set scale factor in relation to the value of the transitory component, compressing or companding the derived values so as to saturate them softly, or the like. The scale factor also defines whether the direction of adjusting the pointing angle of the camera will correspond to or be the opposite of the direction of the measurement associated with the gimbal's movement (for example, whether acceleration, velocity, or displacement upward would require a tilt up or down).

In some embodiments, the scaling step 1840 and the filtering step 1830 are combined. For example, the scale factor may be incorporated into a filter. In such embodiments, the method 1800 essentially includes a single step of determining the noise value based on the measurement associated with the movement of the active stabilization system (gimbal) instead of the steps 1830 and 1840.

As discussed in greater detail with respect to FIG. 16, the noise value generally defines how the camera's pointing angle is to be adjusted. At step 1850, the noise value is injected into the stabilization process and the stabilization process is executed using the noise value to introduce a controlled disturbance into the active stabilization system. More specifically, as discussed with respect to FIG. 16, noise can be introduced (injected or the like) into the stabilization system at different levels. At what level the noise is introduced varies between different embodiments.

In some embodiments, the noise value is injected by changing the command pointing angle to a different value, thus causing the stabilization process to stabilize the camera's pointing angle to an angle different from the originally commanded angle. In such embodiments, the noise value outputted by step 1840 is expressed as an angle. The noise value is used to adjust (modify, update, or the like) the commanded angle (command pointing angle) by being added to (summed into) the commanded angle. The resulting commanded angle is inputted into the angle-based control loop of the active stabilization process, such as discussed with respect to FIG. 16. The active stabilization process is then executed in a regular manner, such as described with respect to FIG. 14. Because the commanded angle inputted into the stabilization process differs from the original commanded angle, after executing the control loop update, the stabilization process effectively issues a control command for adjusting the camera's pointing angle in a direction away from the originally commanded pointing angle. In this manner, a controlled disturbance is introduced into the otherwise stabilized system. By applying the noise signal at the command angle level, a controlled behavior (disturbance) is generated. Such disturbance relates to perceived displacement and actual distance from the camera to the filming target together with the lens geometry.

In some embodiments however, the noise value is expressed as an angular rate. In such embodiments, the noise value is used to modify the command tilt rate, before it is to be processed by the PID control loop. That is, the command pointing angle remains the same, but a desired adjustment of the camera's pointing angle for introducing disturbance is still achieved at the rate-based control loop level by modifying the command angle rate.

In some other embodiments, the noise value is expressed as a torque value and is used to modify a control command issued by the active stabilization process. In such embodiments, the active stabilization process determines the control command in a regular manner, such as described with respect to FIG. 14, based on an unmodified command pointing angle. To adjust camera's pointing angle, the noise value is rather injected into the control command. That is, by using the derived noise value to modify the control command controlling the camera's pointing angle, the camera's pointing angle is adjusted in a direction away from the originally commanded pointing angle.

Accordingly, injecting the noise after the angle-based P or rate-based PID loop has been executed, as described, also enables for a noise related motion (disturbance) to be introduced into the system. However, such disturbance will be less regulated than the disturbance introduced into the commanded angle. For example, applying the noise signal at the control output will cause a torque modulation. However, the time constant dynamics of the control loop would seek to cancel the motion out and achieve smooth stabilization. By adjusting the update frequencies and the control loop PID gains, a desired disturbance, though less determinate in its behavior, can still be introduced.

After the step 1850 has been executed (the stabilization process ran its update with an injected noise), the method 1800 then returns to step 1820 to derive and process the next measurement associated with the movement of the active stabilization system (gimbal). That is, steps 1820, 1830, 1840, and 1850, represent a single update cycle for introducing a controlled disturbance into the active stabilization process and are repeated at a fixed update rate while filming is performed using the induced disturbance mode. By repeating these steps, a controlled disturbance is introduced into the system synchronously to the movement of the active stabilization system. In some embodiments, however, the disturbance is introduced with a delay, to achieve a special effect. In such embodiments, measurements associated with the translational movement are acquired and processed generally in the same way. However, rather than injecting the currently determined noise value, a noise value from one of the preceding cycles is introduced into the stabilization process instead, so as to create a delay effect. Such a delay may for example be appropriate in a scenario where a normal physical reaction to an environment condition is slightly delayed, e.g., a person walking on a rocking boat, a person under influence. The phase of disturbance is changed as well, in some embodiments, for example, increased, reduced, or reversed (opposite effect).

As discussed herein, these steps may be performed for one or more of the pan, tilt, and roll axes, in parallel, in association with the gimbal's movement. The camera operator may interrupt the process at any point, for example, by stopping the filming process. In some embodiments, the scale factors and/or filter bandwidth may be adjusted at any point, without interrupting the filming, for example, by a remote operator.

Figure 19:
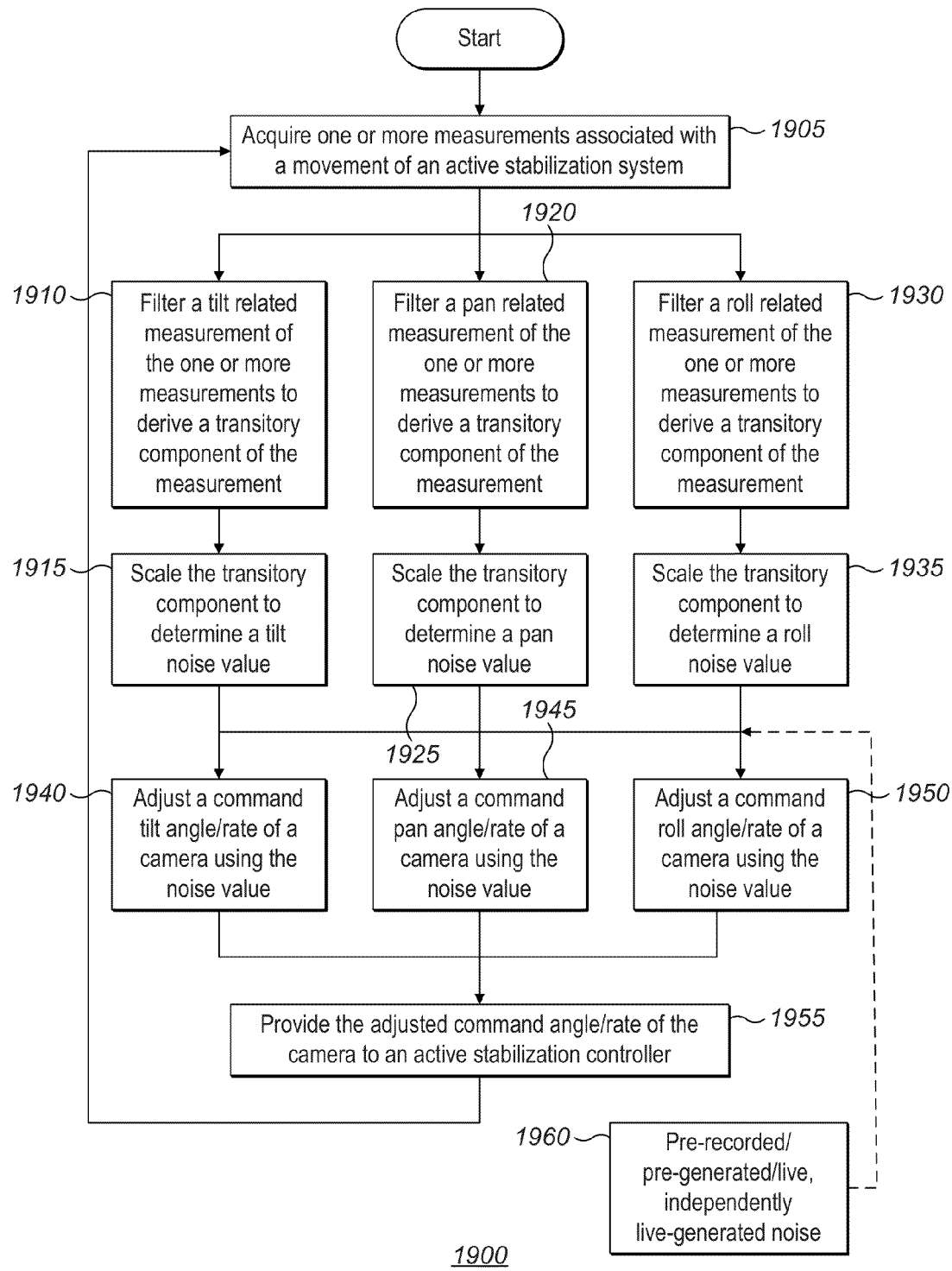
FIG. 19 illustrates a flowchart of a method for introducing controlled disturbance into an active stabilization system, according to some other embodiments.

FIG. 19 illustrates a flowchart of a method 1900 for introducing controlled disturbance into an active stabilization system, according to some embodiments. As shown, the method 1900 is performed in parallel for the three axes (pan, tilt, and roll).

The method 1900 starts with step 1910, at which one or more measurements associated with a movement of the active stabilization system (gimbal) are derived, measured, sensed, acquired, or otherwise obtained. Such measurements may, for example, be derived by the system's IMU. When the induced disturbance mode is activated for only one of the axes, the IMU may provide only one measurement for that axis only, or alternatively, provide a combined vector for the measurements for all axes. As generally discussed with respect to FIGS. 16 and 18, such measurements may include acceleration measurement(s) derived by the system's IMU for one or more of the axes, acceleration measurement(s) derived by a remote IMU detecting measurements in association with the gimbal's movement (e.g., an IMU mounted on a chassis of a vehicle carrying the gimbal during shooting), gimbal joint angle measurement(s) for one or more of the axes, velocity, displacement, rotational noise from the gimbal actuator(s), distance measurements (such as a vertical distance to a reference point, horizontal distance to a reference point, or the like measured by a distance sensor), barometric measurements, GPS data, and/or the like.

At steps 1910, 1920, and 1930, the measurements are respectively filtered to derive corresponding transitory components, for example, in the manner described with respect to step 1830 of FIG. 18. The derived transitory components are then scaled by respective scale factors at steps 1915, 1920, and 1930, for example, in the manner described with respect to step 1840 of FIG. 18. Each of the steps 1940, 1945, and 1950, in combination with the step 1955, is generally similar to step 1850 of FIG. 18 as described in relation to the noise value being in the form of an angle, as related to each of the pan, tilt, and roll axes.

However, unlike in FIG. 18, where step 1850 simply takes, as an input, the noise value derived by scaling, in FIG. 19, each of the steps 1940, 1945, and 1950 may receive a noise value that has been modified post-scaling. For example, as discussed with respect to FIG. 16, in some embodiments, the noise values derived for each of the axis are combined and the combined noise value is then used to adjust the pointing angle for only one of the axes, e.g., for the tilt axis. In method 1900, the output of one or more of the steps 1915, 1925, and 1935 may be combined and provided to one or more of the steps 1940, 1945, and 1950 for adjusting respective pointing angles.

Additionally, or alternatively, an additional noise may be introduced into the active stabilization system. As shown in FIG. 19, such noise may be provided from an outside source and be pre-recorded (e.g., during some previous takes of the scene) and processed to derive the noise, pre-generated (e.g., to emulate a certain effect, such as an earthquake), and/or be generated live, but independent of the gimbal's movement. Although, as shown, such noise is introduced as being added to one or more of the outputs of the steps 1915, 1925, and 1935, in some embodiments, the additional noise is introduced in the form of acceleration measurements (raw or transitory) or angular rates (raw or jitter). Thus, the additional noise measurements may also be introduced before steps 1910, 1920, and 1930 and be added to one or more of the respective raw measurements or before steps 1915, 1925, and 1935 and be added to one or more of the respective transitory components.

Upon providing the adjusted (noisy) command angle(s)/rate(s) for further stabilization processing at step 1955, the method 1900 returns to step 1910 to derive and process the next one or more measurement associated with the movement of the active stabilization system (gimbal). That is, similar to the method 1800, the method 1900 represents a single updated cycle for introducing a controlled disturbance into the active stabilization process and is repeated at a fixed update rate while filming is performed using the induced disturbance mode. The camera operator may interrupt the process at any point, for example, by stopping the filming process. In some embodiments, although not shown in FIG. 19, the scale factors and/or filter bandwidth may be adjusted at any point, without interrupting the filming, for example, by a remote operator.

As discussed with respect to FIGS. 16 and 18, the noise value may also be in the form of the angular rate or torque value. The skilled person would appreciate that the method 1900 may be modified to incorporate such noise values in the manner discussed with respect to FIG. 18.

The order of execution or performance of the operations in the embodiments illustrated and described herein is not essential, unless otherwise specified. Further, not all operations are necessarily performed. For example, as discussed, step 1810 of the method 1810 may be performed at any point of method, or not performed at all. That is, the operations/steps described herein, for example, with respect to FIGS. 16, 18, and 19, may be performed in any order, unless otherwise specified, and embodiments may include additional or fewer operations/steps than those disclosed herein. For example, a particular selected order and/or number of steps of methods may depend on camera's operator preferences and/or technical specifications of the gimbal stabilization system and/or camera and/or their components. It is further contemplated that executing or performing a particular operation/step before, contemporaneously with, or after another operation is in accordance with the described embodiments.

The methods and operations described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

It should be further understood that multiple parameters and settings discussed herein are adjustable by the camera operator and/or remote operator, at the time the active stabilization system is initialized and/or while in use, e.g., during filming. More specifically, in some embodiments, the remote operator may set up or adjust any of the parameters and settings discussed herein, using a remote controller, a computer (or other processing device) running a set-up/adjustment application, or any other device in communication with the active stabilization system and/or camera, via a remote link, wireless, such as radio (e.g., cellular, Wi-Fi, Bluetooth) or wired (e.g., fiber optics, cabling, or the like). The set-up/adjustment application provides its user (e.g., remote operator, camera operator, or other) with a graphical interface (GUI) that enables the user to select and adjust desired parameters and/or settings for the active stabilization system and/or camera, activate or deactivate different modes supported by the active stabilization system, including for selected or all axes (pan, tilt, roll), and/or camera, and the like. Corresponding commands (data, values) are transmitted to the active stabilization system and/or camera so as to update the respective parameters and settings there. That is, the user is able to control and adjust various parameters and settings of the camera and/or active stabilization system and/or activate/deactivate different modes remotely, using a specially designed application, installed on the device or web-based. The adjustable parameters and settings include, but are not limited to, camera's settings, e.g., focal settings, such as a focal length of the lens; distances, e.g., to the filming subject, height, or the like; various thresholds, scale factors, forcing functions, control loops settings, such as PID gains, maximum and/or minimum values, filters settings and bandwidth, settings for different axes, sensors' settings, storage settings, control rates, calibrations, offsets, and the like. The application may also inform the user about the system/camera's status and voice alarms when errors are detected.

Further, while the invention has been described in terms of various specific embodiments, the skilled person would recognize that the invention can be practiced with modification within the spirit and scope of the claims.

The invention claimed is:

1. A method for introducing controlled disturbance into an active stabilization system executing a stabilization process to stabilize a pointing angle of a camera housed by the active stabilization system in accordance with a commanded angle, the method comprising:

acquiring a measurement associated with a movement of the active stabilization system;
determining a noise value based on the acquired measurement; and
injecting the noise value into the stabilization process causing the process to adjust the pointing angle of the camera in a direction away from the commanded angle of the camera.

2. A method according to claim 1, wherein the injecting step comprises:
adjusting the commanded pointing angle using the noise value; and
executing the stabilization process based on the adjusted commanded angle.

3. A method according to claim 1, wherein the injecting step comprises:
executing an angle-based control loop of the stabilization process based on the commanded angle to calculate a commanded rate;
adjusting the commanded angle rate using the noise value; and
executing a rate-base loop of the stabilization process based on the adjusted commanded angle.

4. A method according to claim 1, wherein the injecting step comprises:
executing a control loop based on the commanded angle to issue a control command directed to maintain a pointing angle at the commanded pointing angle;
adjusting the control command based on the noise value; and
providing the adjusted control command to an actuator of the active stabilization system to adjust the pointing angle of the camera in the direction away from the commanded pointing angle.

5. A method according to claim 1, wherein the determining step comprises:
filtering the measurement to derive a transitory component of the measurement; and
scaling the transitory component to determine the noise value.

6. A method according to claim 2, wherein the measurement is filtered using a high-pass filter to remove a DC component from the measurement.

7. A method according to claim 5, wherein one or more of:
different scale factors are used in the scaling step in relation to at least two of a tilt axis, a pan axis, and a roll axis; and
different bandwidths are set for filters used for filtering the measurement in relation to at least two of a tilt axis, a pan axis, and a roll axis.

8. A method according to claim 5, further comprising:
adjusting one or more of a scale factor used for scaling of the transitory component and a bandwidth of a filter used for filtering the measurement.

9. A method according to claim 8, further comprising:
setting the scale factor to zero in association with one or more of a pan axis, tilt axis, and a roll axis to stop introduction of the disturbance for the one or more axes.

10. A method according to claim 1, further comprising:
repeating the acquiring, determining, and injecting steps to introduce controlled disturbance synchronously to the movement of the active stabilization system.

11. A method according to claim 1, wherein the measurement is one of:
a measurement based on a joint angle of the active stabilization system for one of a pan axis, a tilt axis, and a roll axis, an acceleration measurement derived by an inertial measurement unit of the active stabilization system for one or more of the pan axis, the tilt axis, and the roll axis with a reference to a field of view of the camera;

an acceleration measurement derived by a sensor in association with the movement of the active stabilization system, wherein the sensor is located remotely to the active stabilization system;

a velocity measurement derived by the inertial measurement unit of the active stabilization system for one or more of the pan axis, the tilt axis, and the roll axis;

a positional measurement derived based on one or more of a barometer measurement in combination with an acceleration measurement derived by the inertial measurement unit, a distance measurement derived by a range sensor of the active stabilization system, and a GPS measurement.

12. A method according claim 1, wherein the acquiring step comprises acquiring the measurement associated with a movement of the active stabilization system using a sensor located remotely to the active stabilization system.

13. A method according to claim 1, wherein the active stabilization system is positioned on a moving vehicle and the sensor is located on the vehicle remotely to the active stabilization system.

14. A method according to claim 1, wherein
the method is performed for one of a pan axis, a tilt axis, and a roll axis; and
the pointing angle of the camera is adjusted for the one axis.

15. A method according to claim 1, comprising:
performing the acquiring and determining steps for two or three of a pan axis, a tilt axis, and a roll axis to determine respective two or three noise values; and
combining the two or three noise values to determine a combined noise value,
wherein the injecting step comprises:
injecting the noise value into the stabilization process, causing the process to adjust the pointing angle of the camera in a direction away from the commanded pointing angle of the camera in relation to only one of the three axes using the combined noise value.

16. A method according to claim 2, wherein the commanded angle is adjusted in one of: a direction opposite to a direction indicated by the acquired measurement and a same direction as the direction indicated by the acquired measurement.

17. A method according to claim 1, wherein the noise value is one of an angle, an angular rate, a control torque, and a drive current.

18. A method according to claim 1, further comprising:
modifying the noise value, prior to injecting the noise value into the stabilization process, based on one or more of: a pre-recorded noise value, a pre-generated noise value, and independently live-generated noise value.

19. A non-transitory computer-readable medium storing program instructions for causing a processor to perform a method for introducing controlled disturbance into an active stabilization system executing a stabilization process to stabilize a pointing angle of a camera housed by the active stabilization system in accordance with a commanded angle, the method comprising:
acquiring a measurement associated with a movement of the active stabilization system;
determining a noise value based on the acquired measurement; and
injecting the noise value into the stabilization process causing the process to adjust the pointing angle of the camera in a direction away from the commanded angle of the camera.

20. An active stabilization system, housing a camera, for introducing controlled disturbance, the system comprising:
a sensor device configured to derive a measurement associated with a movement of the active stabilization system; and
an active stabilization controller configured to:
execute a stabilization process to stabilize a pointing angle of the camera for one or more of a pan axis, a tilt axis, and a roll axis in accordance with a commanded angle;
acquire the measurement associated with the movement of the active stabilization system from the sensor device;
determine a noise value based on the derived measurement; and
inject the noise value into the stabilization process causing the process to adjust the pointing angle of the camera in a direction away from the commanded angle of the camera.

* * * * *